United States Patent
Nagatomi

(10) Patent No.: US 8,345,528 B2
(45) Date of Patent: *Jan. 1, 2013

(54) OPTICAL PICKUP DEVICE

(75) Inventor: Kenji Nagatomi, Kaizu (JP)

(73) Assignee: Sanyo Electric Co., Ltd., Osaka (JP)

( * ) Notice: Subject to any disclaimer, the term of this patent is extended or adjusted under 35 U.S.C. 154(b) by 87 days.

This patent is subject to a terminal disclaimer.

(21) Appl. No.: 12/872,276

(22) Filed: Aug. 31, 2010

(65) Prior Publication Data

US 2011/0051590 A1    Mar. 3, 2011

(30) Foreign Application Priority Data

Sep. 1, 2009  (JP) .................................. 2009-201936

(51) Int. Cl.
*G11B 7/00* (2006.01)

(52) U.S. Cl. ......... 369/112.09; 369/112.03; 369/112.14; 369/112.28; 369/44.23

(58) Field of Classification Search ............. 369/112.01, 369/112.03, 112.09, 112.1, 112.14, 112.23, 369/112.15, 112.28, 44.23
See application file for complete search history.

(56) References Cited

U.S. PATENT DOCUMENTS

| | | | | |
|---|---|---|---|---|
| 4,817,074 | A * | 3/1989 | Yamanaka | 369/44.24 |
| 6,392,977 | B2 * | 5/2002 | Ando et al. | 369/112.01 |
| 6,947,367 | B2 * | 9/2005 | Nakamura et al. | 369/112.09 |
| 7,623,434 | B2 * | 11/2009 | Kimura et al. | 369/112.08 |
| 7,742,384 | B2 * | 6/2010 | Yamasaki et al. | 369/112.28 |
| 7,859,976 | B2 * | 12/2010 | Hiraga et al. | 369/112.05 |
| 2005/0128896 | A1 * | 6/2005 | Katayama | 369/44.23 |
| 2006/0013110 | A1 * | 1/2006 | Aiki | 369/112.01 |
| 2008/0175110 | A1 | 7/2008 | Yamasaki et al. | |
| 2008/0186836 | A1 * | 8/2008 | Tanaka et al. | 369/112.24 |
| 2010/0080106 | A1 | 4/2010 | Nagatomi et al. | |
| 2010/0232282 | A1 | 9/2010 | Nagatomi et al. | |
| 2010/0329102 | A1 | 12/2010 | Nagatomi | |

FOREIGN PATENT DOCUMENTS

| | | | |
|---|---|---|---|
| JP | 2006-252716 A | 9/2006 |
| JP | 2006-260669 A | 9/2006 |
| JP | 2007-213754 A | 8/2007 |
| JP | 2008-102998 A | 5/2008 |
| JP | 2008-171470 A | 7/2008 |

(Continued)

OTHER PUBLICATIONS

Explanation of Circumstances Concerning Accelerated Examination for Japanese Application No. 2009-177046, dated Sep. 10, 2010, pp. 1-12.

(Continued)

*Primary Examiner* — Thomas Alunkal
(74) *Attorney, Agent, or Firm* — Ditthavong Mori & Steiner, P.C.

(57) ABSTRACT

An optical pickup device includes an objective lens portion which converges laser light at a first focal point and a second focal point; an actuator which positions the first focal point or the second focal point on a recording layer in a disc; an astigmatism element which sets a first focal line position and a second focal line position of the laser light reflected on the disc away from each other in a propagating direction of the laser light; a spectral element which disperses four light fluxes obtained by dividing the laser light reflected on the disc in four from each other; and a photodetector having a sensor group which receives the four light fluxes dispersed by the spectral element.

6 Claims, 18 Drawing Sheets

FOREIGN PATENT DOCUMENTS

| | | |
|---|---|---|
| JP | 2008-198336 A | 8/2008 |
| JP | 2008-262663 A | 10/2008 |
| JP | 2009-003986 A | 1/2009 |
| JP | 2009-009630 A | 1/2009 |
| JP | 2009-157978 A | 7/2009 |
| JP | 2009-170060 A | 7/2009 |
| WO | WO 2004/040562 A1 | 5/2004 |
| WO | WO 2007/105704 A1 | 9/2007 |
| WO | WO 2008/007768 A1 | 1/2008 |
| WO | WO 2008/536548 A1 | 5/2008 |
| WO | WO 2008/139686 A1 | 11/2008 |

OTHER PUBLICATIONS

Notification of Reasons for Refusal for Japanese Patent Application No. 2009-201936, dated Oct. 23, 2012, pp. 1-5.
Office Action for Japanese Application No. 2009-177046, dated Nov. 2, 2010, pp. 1-4.
Office Action for U.S. Appl. No. 12/844,245, dated Aug. 21, 2012, pp. 1-25.

* cited by examiner (a) PARALLEL LIGHT PORTION (b) ON S1 PLANE SURFACE (c) ON S0 PLANE SURFACE (d) ON S2 PLANE SURFACE (a) PARALLEL LIGHT PORTION (b) ON S1 PLANE SURFACE (c) ON S0 PLANE SURFACE (d) ON S2 PLANE SURFACE

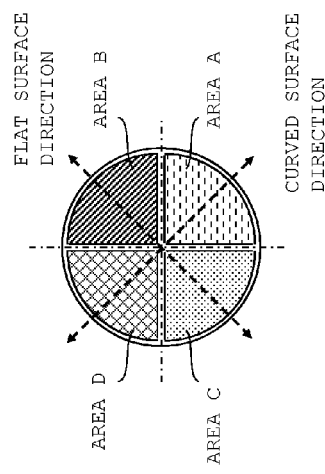
FIG. 6A  LIGHT FLUX DIVIDING PATTERN
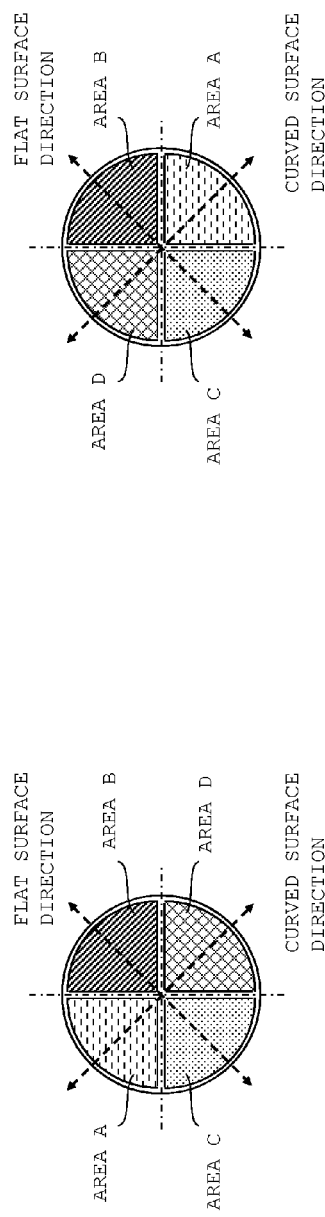
FIG. 6B  SIGNAL LIGHT
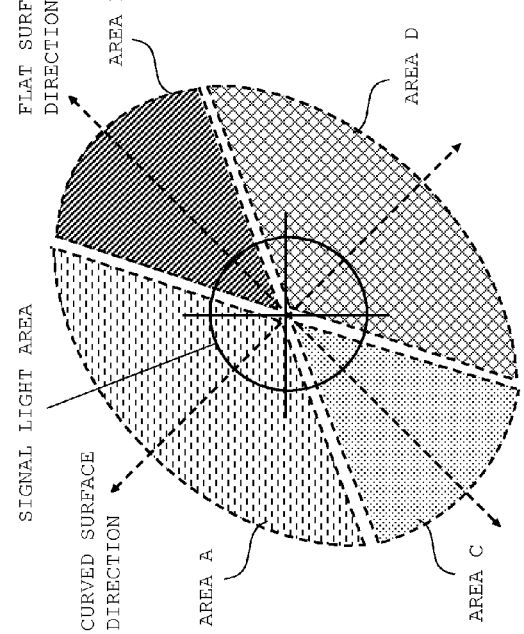
FIG. 6C  STRAY LIGHT 1
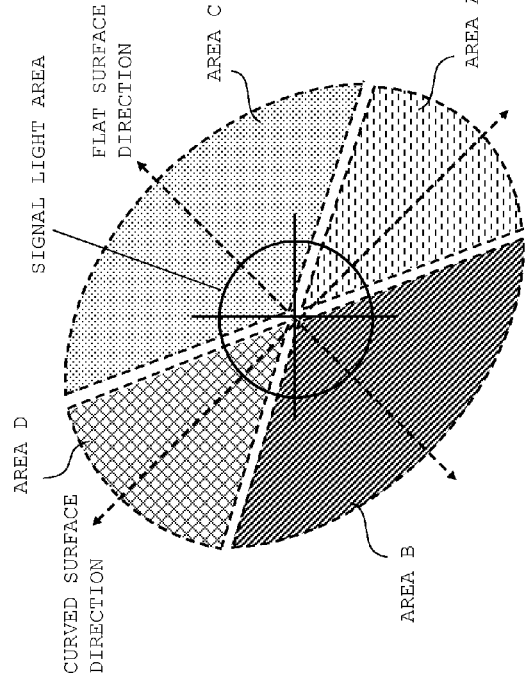
FIG. 6D  STRAY LIGHT 2

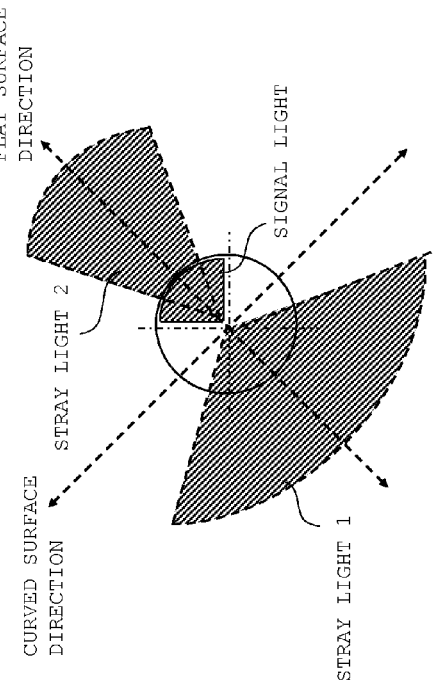
FIG. 7B  LIGHT FLUX STATE IN AREA B
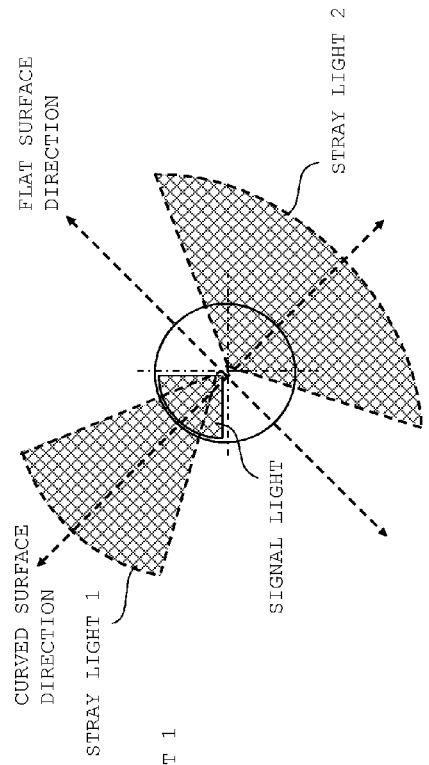
FIG. 7D  LIGHT FLUX STATE IN AREA D
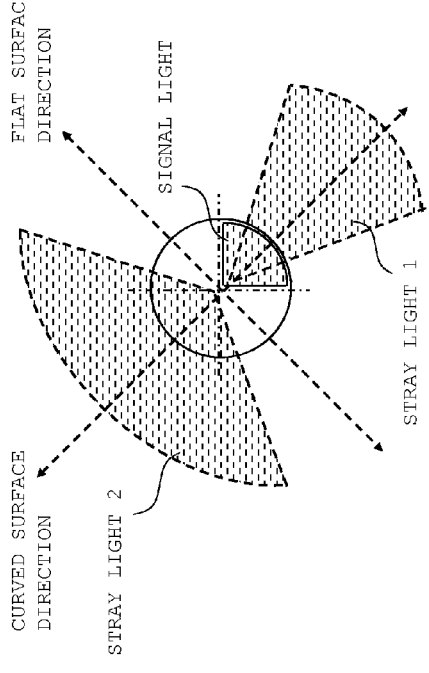
FIG. 7A  LIGHT FLUX STATE IN AREA A
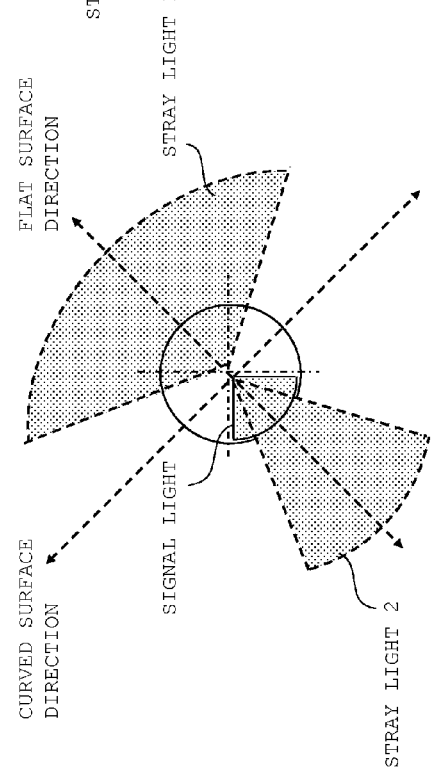
FIG. 7C  LIGHT FLUX STATE IN AREA C

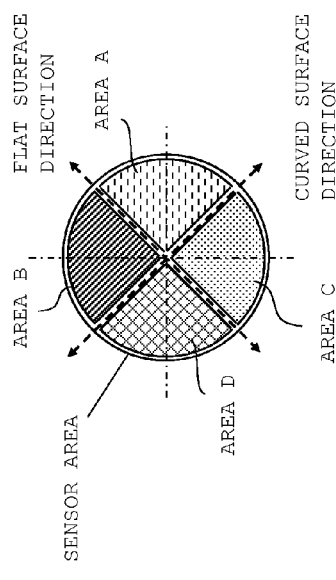
FIG.8B  SIGNAL LIGHT
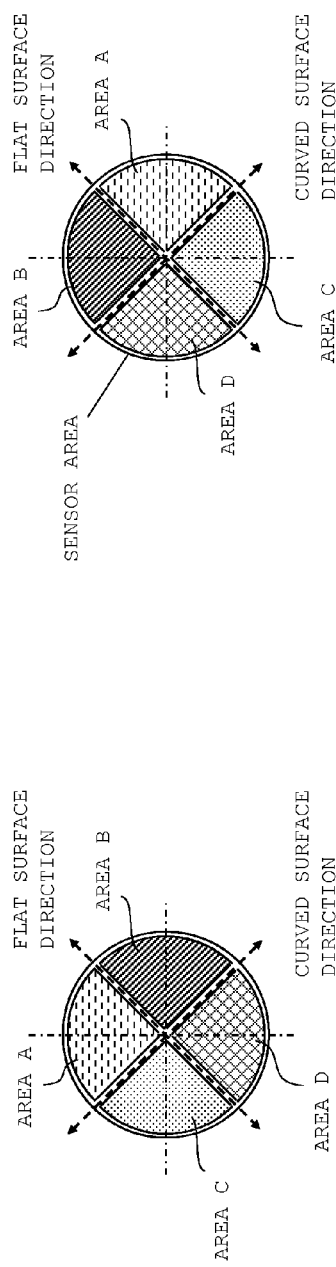
FIG.8A  LIGHT FLUX DIVIDING PATTERN
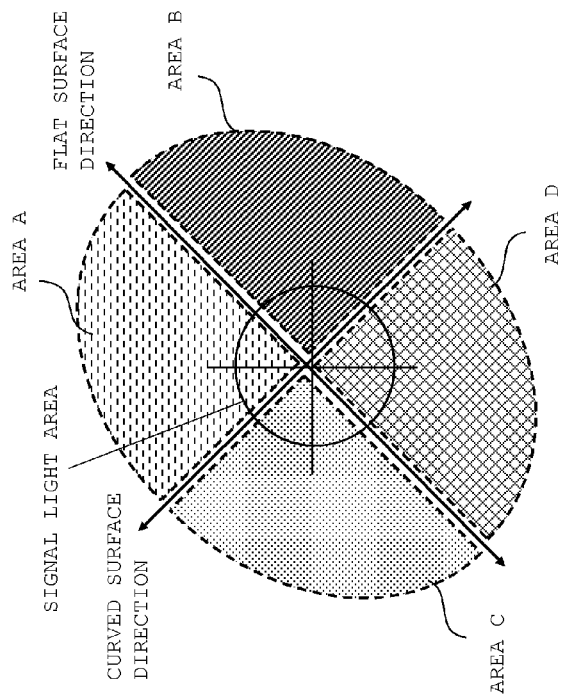
FIG.8D  STRAY LIGHT 2
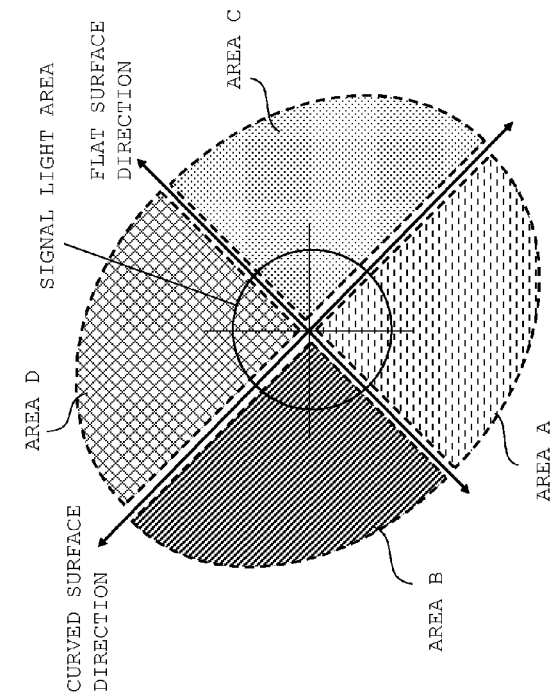
FIG.8C  STRAY LIGHT 1

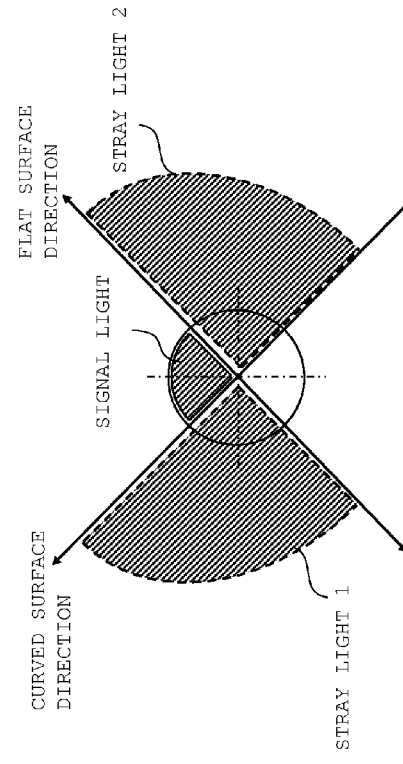
FIG. 9A  LIGHT FLUX STATE IN AREA A
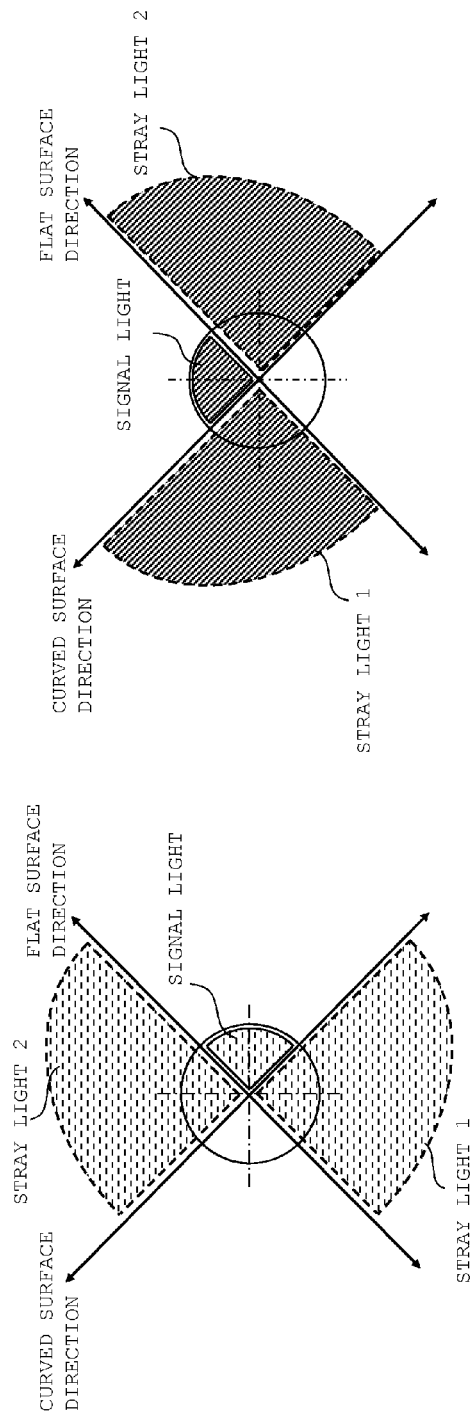
FIG. 9B  LIGHT FLUX STATE IN AREA B
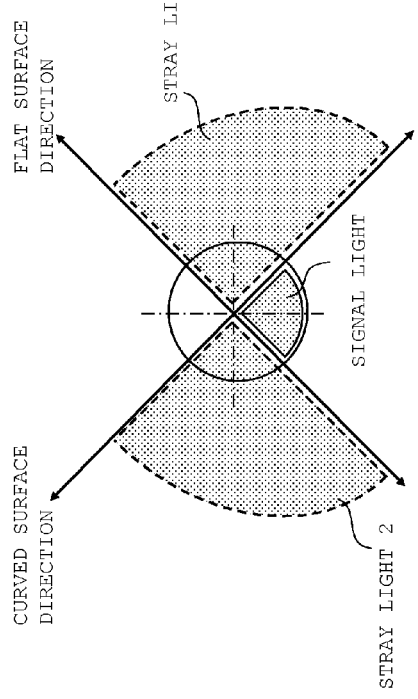
FIG. 9C  LIGHT FLUX STATE IN AREA C
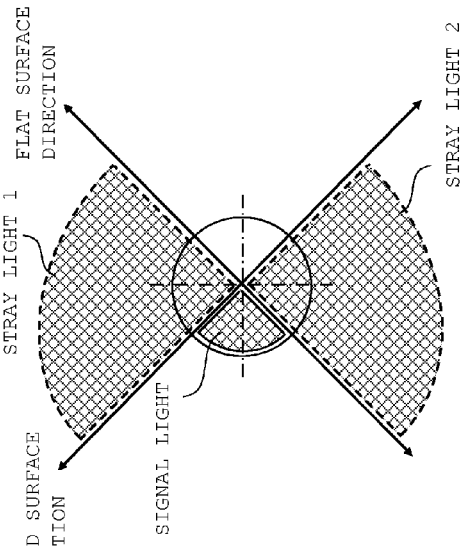
FIG. 9D  LIGHT FLUX STATE IN AREA D

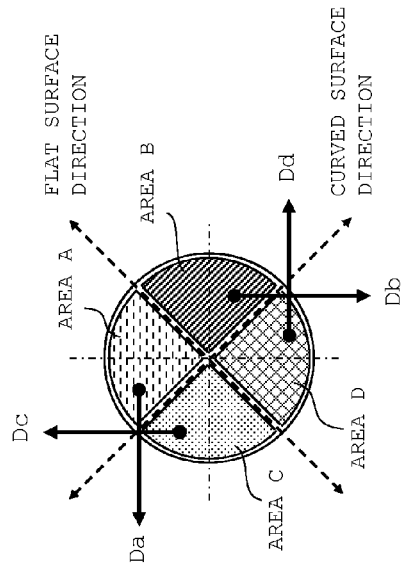
FIG.10A  PROVIDE ANGULAR CHANGE TO EACH AREA
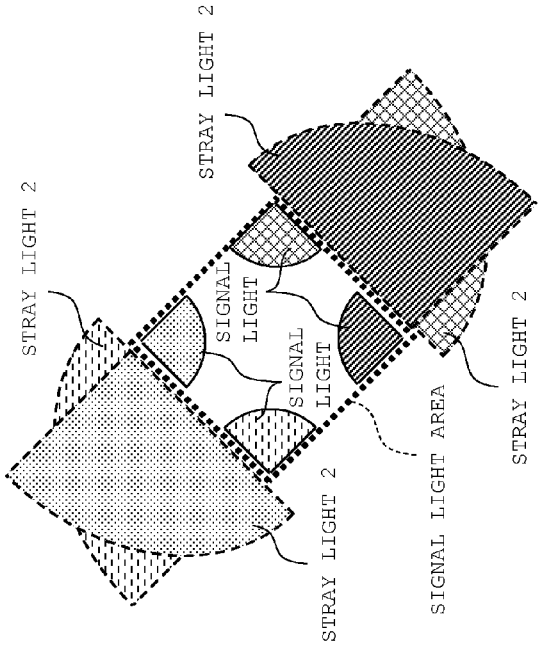
FIG.10B  LIGHT FLUX ON PLANE S0
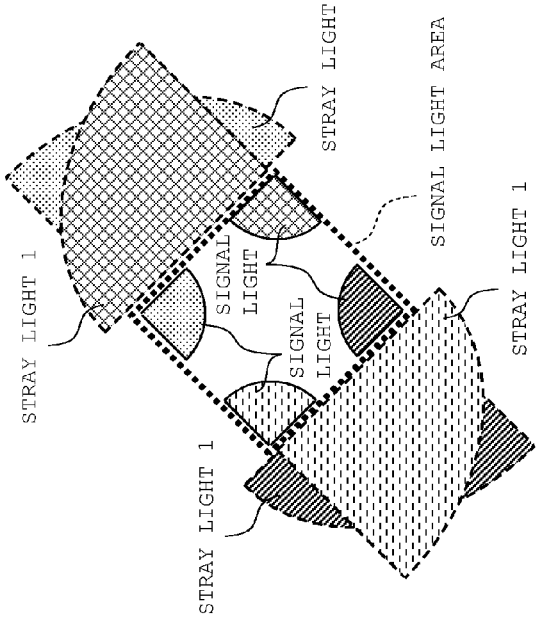
FIG.10C  LIGHT FLUX ON PLANE S0

$FE = (A+B+E+F) - (C+D+G+H)$
$PP = (A+B+G+H) - (C+D+E+F)$ $FE = (A+B+E+F) - (C+D+G+H)$
$PP = (A+B+G+H) - (C+D+E+F)$

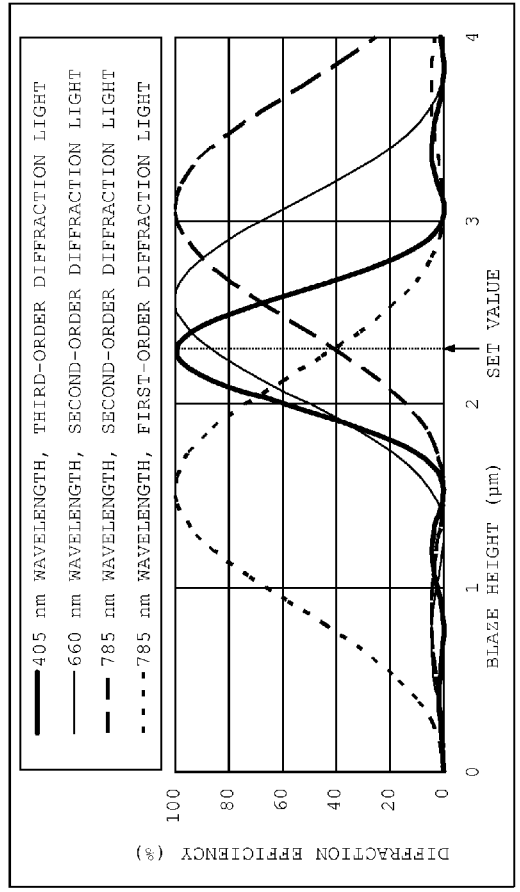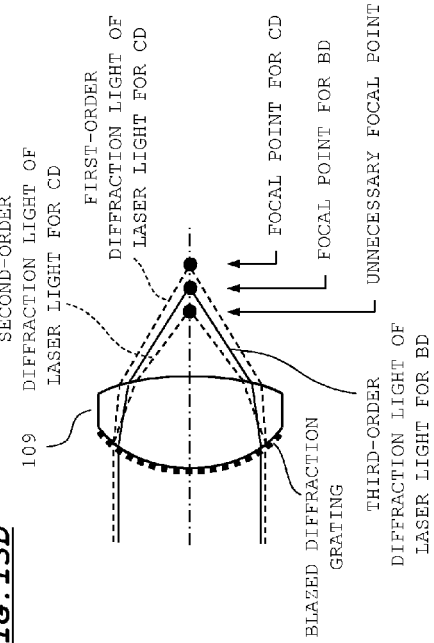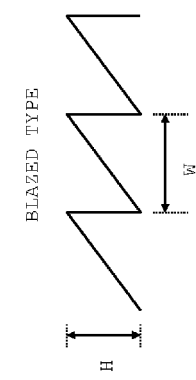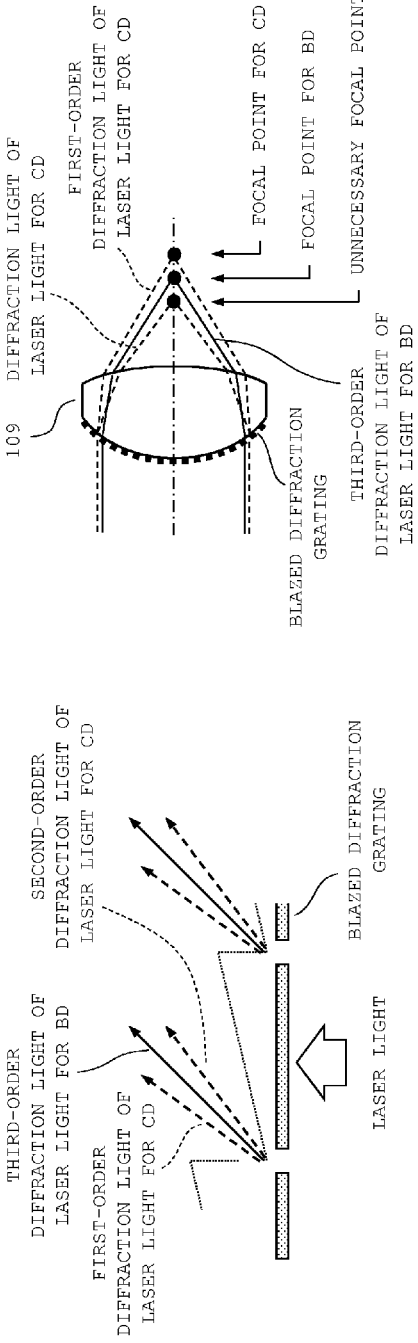
FIG.13A
FIG.13B
FIG.13C
FIG.13D

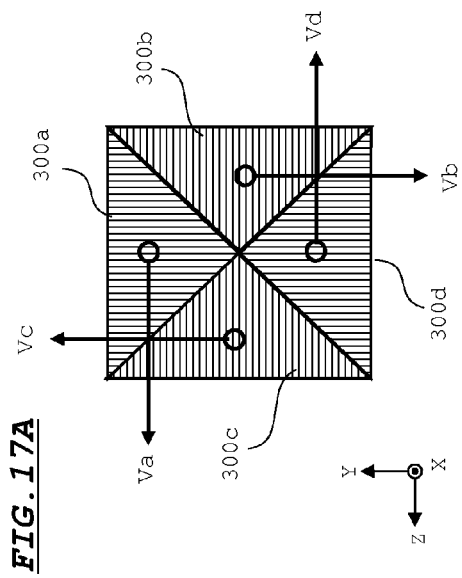
FIG. 17A
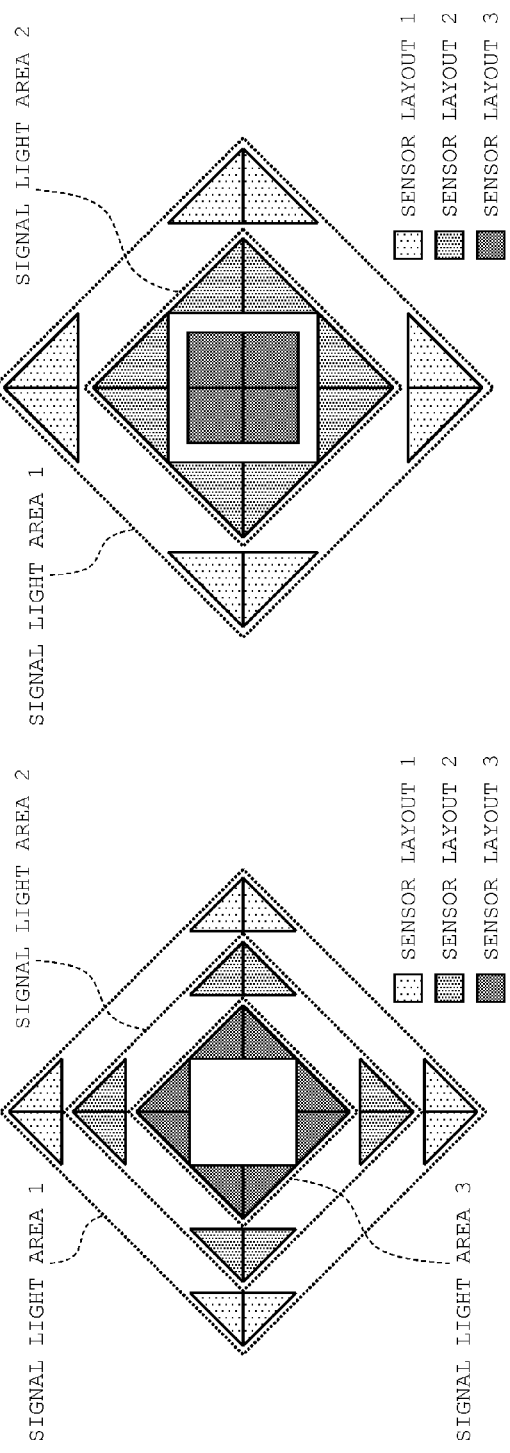
FIG. 17B
FIG. 17C

OPTICAL PICKUP DEVICE

This application claims priority under 35 U.S.C. Section 119 of Japanese Patent Application No. 2009-201936 filed Sep. 1, 2009, entitled "OPTICAL PICKUP DEVICE". The disclosure of the above applications is incorporated herein by reference.

BACKGROUND OF THE INVENTION

1. Field of the Invention

The present invention relates to an optical pickup device, and more particularly to a compatible optical pickup device for recording/reproducing with respect to different kinds of optical discs.

2. Disclosure of Related Art

Currently, there exist various kinds of optical discs, such as Blu-ray Disc (BD), High-Definition Digital Versatile Disc (HDDVD), Digital Versatile Disc (DVD), and Compact Disc (CD). In view of this, there is a demand for a compatible optical pickup device compatible with these various kinds of optical discs.

There is known a compatible optical pickup device, wherein laser light emitted from one light source is distributed to two objective lenses so that the optical pickup device is compatible with both of BD and HDDVD. In this arrangement, the focus positions by the each of the objective lenses are different from each other in the disc thickness direction. Further, it is possible to configure an optical pickup device compatible with both of BD and CD by forming a diffraction hologram on an incident surface of an objective lens. In the above arrangement, however, if a hologram is formed in such a manner as to form one focal point with respect to BD, laser light for CD is focused at two positions i.e. forward and rearward positions in the optical axis direction, because of a wavelength difference between laser light for CD and laser light for BD.

As described above, if two focal points are formed with respect to one laser light, in the case where one of the two focal points is positioned on a recording layer, laser light to be converged on the other of the two focal points may be entered into a photodetector as stray light. The stray light may deteriorate a signal from the photodetector. In view of the above, in the compatible optical pickup device, it is necessary to provide an arrangement of suppressing incidence of stray light into a photodetector.

SUMMARY OF THE INVENTION

An optical pickup device according to a main aspect of the invention includes a laser light source which emits laser light of a predetermined wavelength; an objective lens portion which converges the laser light at a first focal point and a second focal point; an actuator which positions the first focal point or the second focal point on a recording layer in a disc; an astigmatism element which imparts astigmatism to the laser light reflected on the disc to set a first focal line position to be defined by convergence of the laser light in a first direction, and a second focal line position to be defined by convergence of the laser light in a second direction perpendicular to the first direction away from each other in a propagating direction of the laser light; a spectral element which makes propagating directions of four light fluxes obtained by dividing a light flux of the laser light reflected on the disc in four by a first straight line and a second straight line respectively in parallel to the first direction and the second direction different from each other to disperse the four light fluxes from each other; and a photodetector including a sensor group which receives the four light fluxes dispersed by the spectral element.

BRIEF DESCRIPTION OF THE DRAWINGS

These and other objects, and novel features of the present invention will become more apparent upon reading the following detailed description of the embodiment along with the accompanying drawings.

FIGS. 6A through 6D are diagrams for describing the technical principle (an area dividing pattern and a light flux distribution) in the embodiment.

FIGS. 7A through 7D are diagrams for describing the technical principle (an area dividing pattern and a light flux distribution) in the embodiment.

FIGS. 8A through 8D are diagrams for describing the technical principle (an area dividing pattern and a light flux distribution) in the embodiment.

FIGS. 9A through 9D are diagrams for describing the technical principle (an area dividing pattern and a light flux distribution) in the embodiment.

FIGS. 10A through 10C are diagrams for describing the technical principle (an angle changing function and a light flux distribution) in the embodiment.

FIGS. 13A through 13D are diagrams showing an arrangement of an objective lens in example 1.

FIGS. 17A through 17C are diagrams showing a modification example of an angle adjuster, and modification examples of a sensor layout in the embodiment.

Figure 1A:
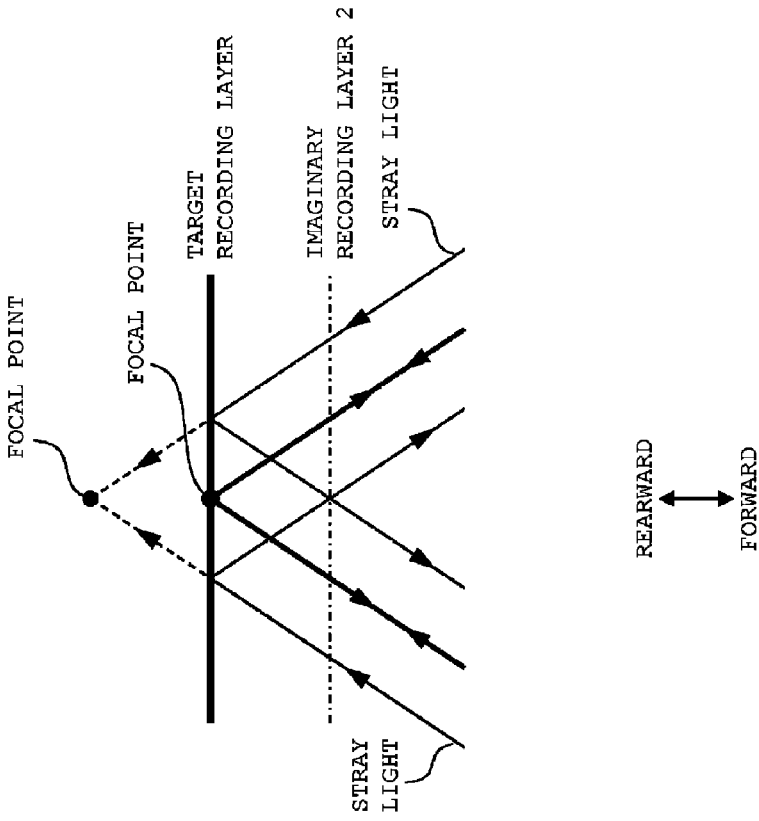
FIGS. 1A and 1B are diagrams for describing a technical principle (optical path of reflection light of laser light which is focused at two different positions) of an embodiment of the invention.

The drawings are provided mainly for describing the present invention, and do not limit the scope of the present invention.

DESCRIPTION OF PREFERRED EMBODIMENTS

In the following, an embodiment of the invention is described referring to the drawings.

Technical Principle

First, a technical principle to which the embodiment of the invention is applied is described referring to FIGS. 1A through 11D.

Figure 1B:
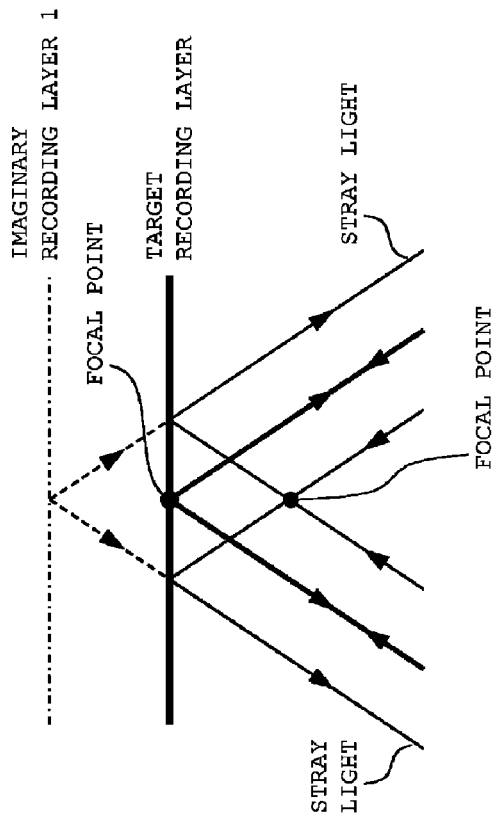

FIGS. 1A and 1B are diagrams showing a state that, in the case where laser light to be converged by an objective lens is focused at two different positions, one of the two focal points is positioned on a target recording layer. FIG. 1A shows a state that the rearward focal point of the two focal points is positioned on the target recording layer, and FIG. 1B shows a state that the forward focal point of the two focal points is positioned on the target recording layer. This embodiment is described based on the premise that a disc has a single recording layer, and there is no recording layer other than the target recording layer.

In the arrangement shown in FIG. 1A, as shown in FIG. 1A, laser light to be converged on the forward focal point is reflected on the target recording layer after focusing. In this state, the reflection light is substantially equivalent to reflection light of laser light, in the case where light is focused on an "imaginary recording layer 1" at a rearward position with respect to the target recording layer. Specifically, in the arrangement shown in FIG. 1A, reflection light from a disc can be regarded as reflection light (signal light) reflected on the target recording layer, and reflection light (stray light) reflected on a recording layer at a rearward position with respect to the target recording layer.

In the arrangement shown in FIG. 1B, as shown in FIG. 1B, laser light to be converged on the rearward focal point is reflected on the target recording layer before focusing. In this arrangement, the reflection light is substantially equivalent to reflection light of laser light, in the case where light is focused on an "imaginary recording layer 2" at a forward position with respect to the target recording layer. Specifically, in the arrangement shown in FIG. 1B, reflection light from a disc can be regarded as reflection light (signal light) reflected on the target recording layer, and reflection light (stray light) reflected on a recording layer at a forward position with respect to the target recording layer.

Figure 2B:
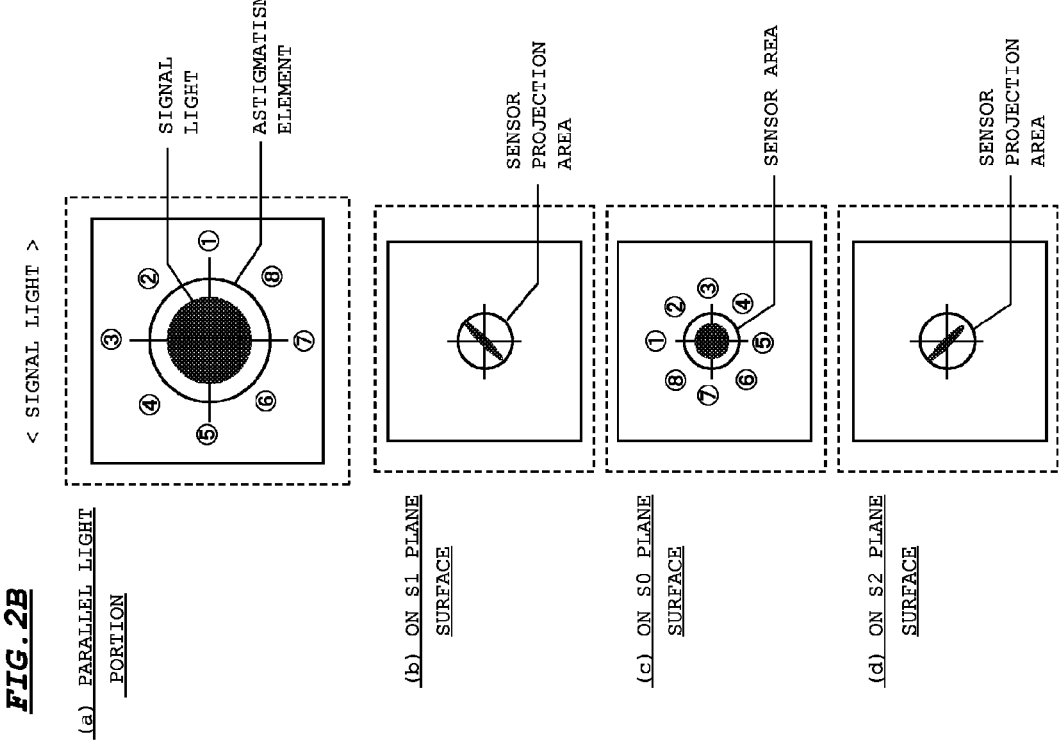
FIGS. 2A and 2B are diagrams for describing the technical principle (as to how light rays propagate) in the embodiment.
Figure 2A:
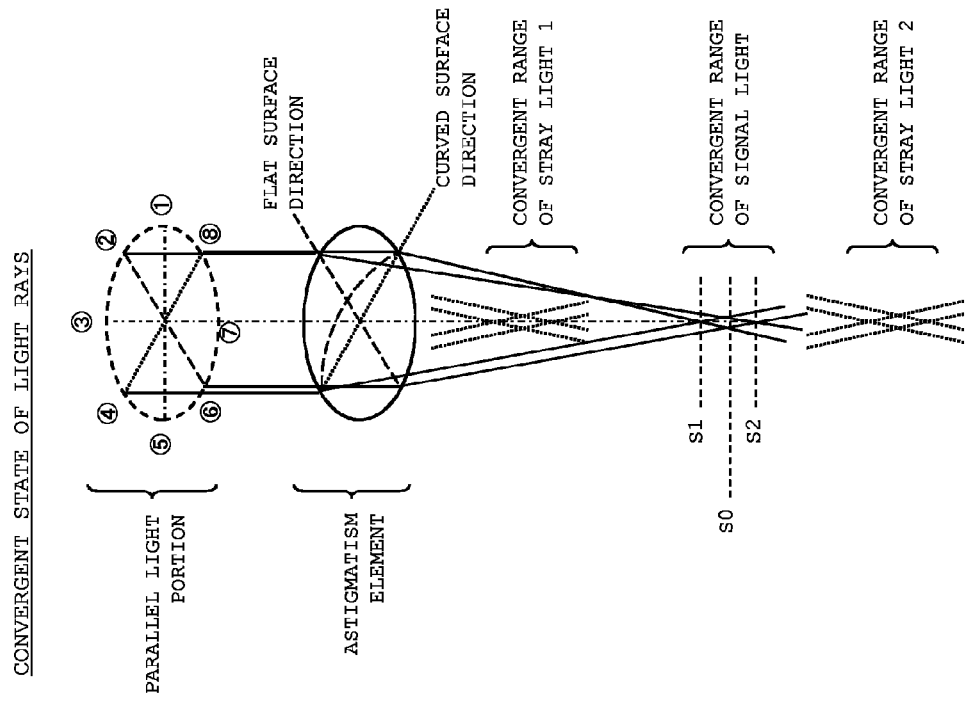

FIG. 2A is a diagram showing convergence states of signal light and stray light, in the case where laser light (signal light) reflected on a target recording layer is entered into an astigmatism element such as an anamorphic lens as parallel light. "Stray light 1" is stray light, in the case where the imaginary recording layer is located at a rearward position with respect to the target recording layer, as shown in FIG. 1A; and "stray light 2" is stray light, in the case where the imaginary recording layer is located at a forward position with respect to the target recording layer, as shown in FIG. 1B. Further, FIG. 2A shows a state that laser light (signal light) for use in a recording/reproducing operation, out of the laser light to be converged on two focal points, is focused on the target recording layer.

As shown in FIG. 2A, a focal line is defined on a plane S1 by convergence of signal light in a "curved surface direction" in FIG. 2A, and a focal line is defined on a plane S2 by convergence of signal light in a "flat surface direction" perpendicular to the curved surface direction, by the function of the anamorphic lens. Then, the spot of signal light is minimized (a least circle of confusion is defined) on a plane S0 between the plane S1 and the plane S2. In focus adjustment based on an astigmatism method, a light receiving surface of a photodetector is disposed on the plane S0.

In this example, to simplify the description on the astigmatism function by the anamorphic lens, the terms "curved surface direction" and "flat surface direction" are used. Actually, however, as far as the anamorphic lens has a function of defining focal lines at different positions from each other, the anamorphic lens may have a curvature in the "flat surface direction" shown in FIG. 2A. In the case where laser light is entered into the anamorphic lens in a convergence state, the shape of the anamorphic lens in the "flat surface direction" may be linear (curvature radius=∞).

As shown in FIG. 2A, the focal line position of stray light 1 (in FIG. 2A, a range between two focal line positions defined by the astigmatism element is referred to as a "convergent range") is closer to the astigmatism element with respect to the focal line position of signal light; and the focal line position of stray light 2 is away from the astigmatism element with respect to the focal line position of signal light.

The sections (a) through (d) in FIG. 2B are diagrams respectively showing beam configurations of signal light on a parallel light portion, and the planes S1, S0, and S2. Signal light entered into the astigmatism element in the shape of a true circle is converted into light of an elliptical shape on the plane S1, and converted into light of a substantially true circle on the plane S0, and then converted into light of an elliptical shape on the plane S2. In this example, the beam configuration on the plane S1 and the beam configuration on the plane S2 have such a relation that the major axes of the beams are perpendicular to each other.

In this example, as shown in FIG. 2A and the section (a) in FIG. 2B, in the case where eight positions (positions 1 through 8: in FIGS. 2A and 2B(a), the positions 1 through 8 are indicated by the numbers enclosed by a circle) are defined counterclockwise on the outer periphery of the beam on the parallel light portion, light rays passing the positions 1 through 8 are each subjected to convergence by the astigmatism element. The position 4 and the position 8 are located on a parting line dividing a beam section of the parallel light portion into two parts by a straight line that is in parallel to the curved surface direction, and the position 2 and the position 6 are located on a parting line dividing the beam section of the parallel light portion into two parts by a straight line that is in parallel to the flat surface direction. The positions 1, 3, 5, and 7 are located on mid positions of an arc portion of the outer perimeter respectively defined by the positions 2, 4, 6, and 8.

Light rays passing the positions 4 and 8 on the parallel light portion are converged into a focal line in the curved surface direction on the plane S1, and entered into the plane S0. Accordingly, the light rays passing the positions 4 and 8 on the parallel light portion pass the positions 4 and 8 shown in the section (c) of FIG. 2B on the plane S0. Similarly, the light rays passing the positions 1, 3, 5, and 7 on the parallel light portion are converged into a focal line in the curved surface direction on the plane S1, and entered into the plane S0. Accordingly, the light rays passing the positions 1, 3, 5, and 7 on the parallel light portion pass the positions 1, 3, 5, and 7 shown in the section (c) of FIG. 2B on the plane S0. On the other hand, the light rays passing the positions 2 and 6 on the parallel light portion are entered into the plane S0 without convergence into a focal line in the curved surface direction on the plane S1. Accordingly, the light rays passing the positions 2 and 6 on the parallel light portion pass the positions 2 and 6 shown in the section (c) of FIG. 2B on the plane S0.

Figure 3B:
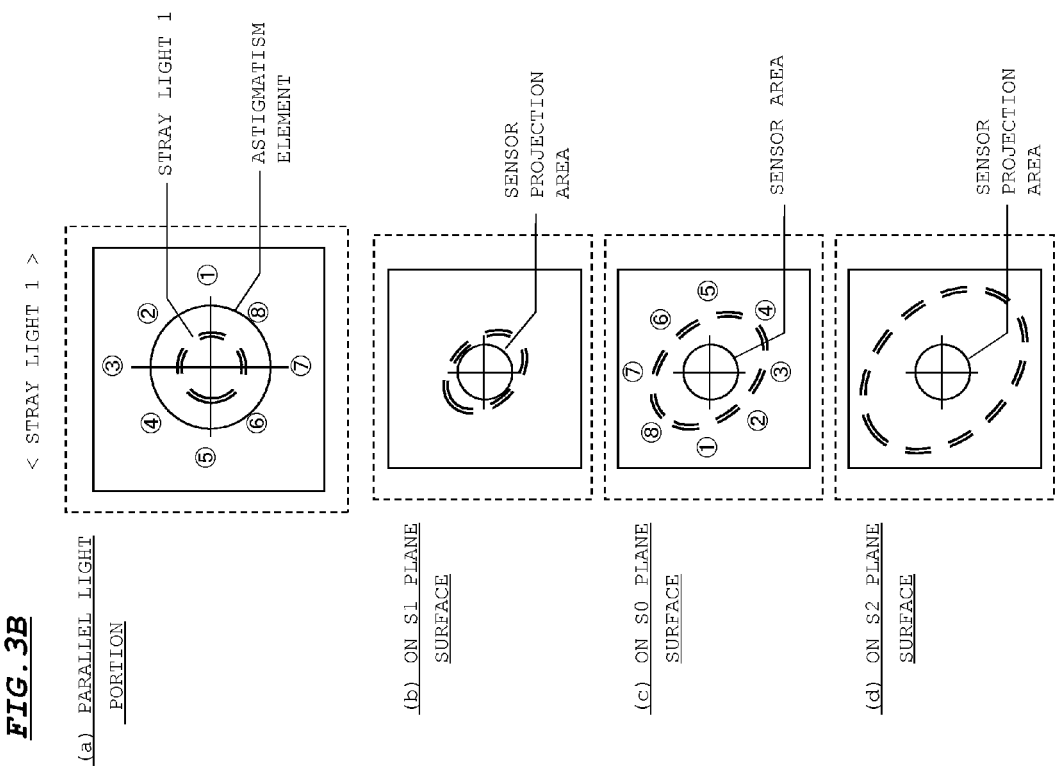
FIGS. 3A and 3B are diagrams for describing the technical principle (as to how light rays propagate) in the embodiment.
Figure 3A:
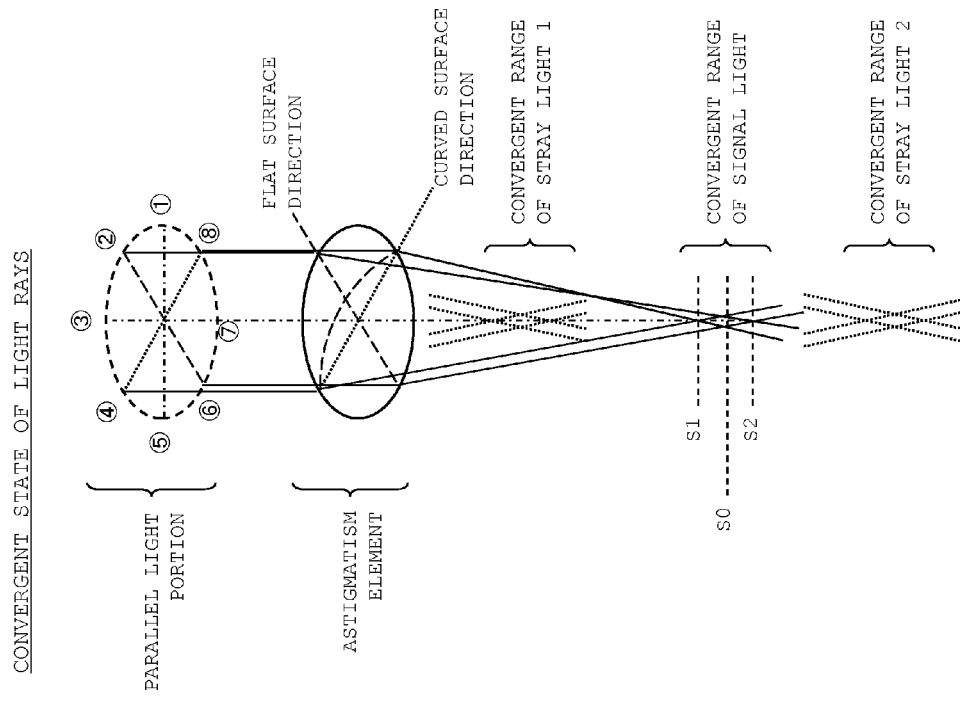

Sections (a) through (d) in FIG. 3B are diagrams respectively showing beam configurations and light ray passing positions of stray light 1 on the parallel light portion, and the planes S1, S0, and S2. As shown in the section (a) of FIG. 3B, similarly to the signal light, in the case where eight positions 1 through 8 are defined on the outer periphery of stray light 1, light rays passing the eight positions 1 through 8 on the parallel light portion are converged into a focal line in the curved surface direction or a focal line in the flat surface direction, and entered into the plane S0. Accordingly, the light rays passing the positions 1 through 8 on the parallel light portion respectively pass the positions 1 through 8 shown in the section (c) of FIG. 3B on the plane S0.

Figure 4B:
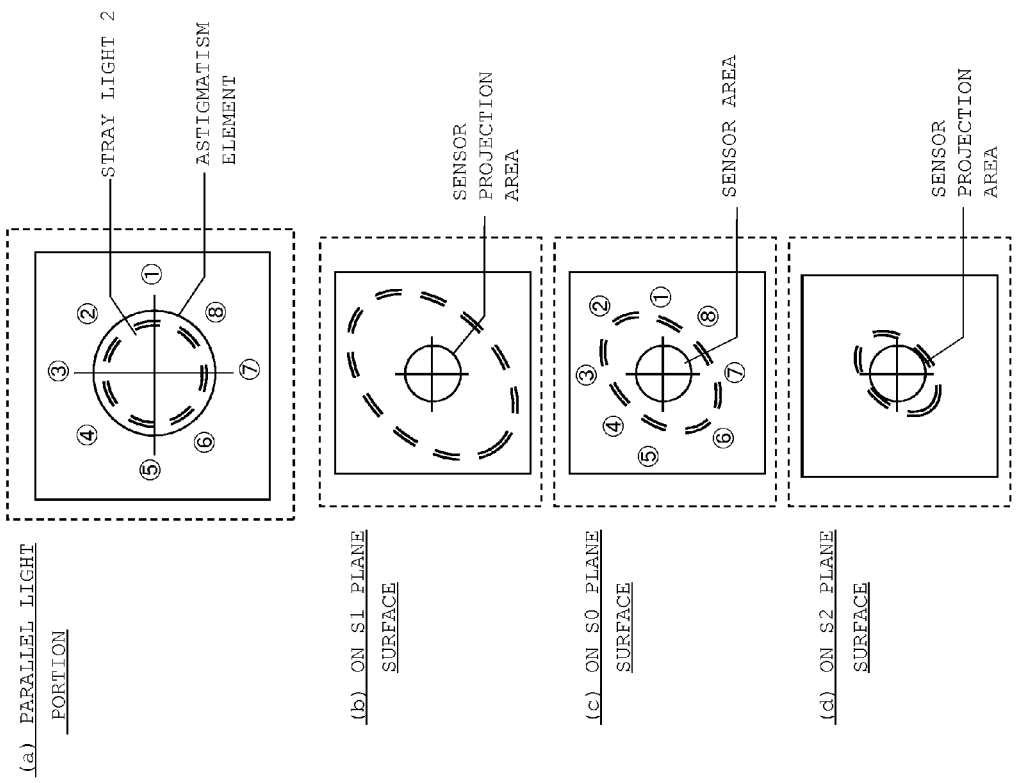
FIGS. 4A and 4B are diagrams for describing the technical principle (as to how light rays propagate) in the embodiment.
Figure 4A:
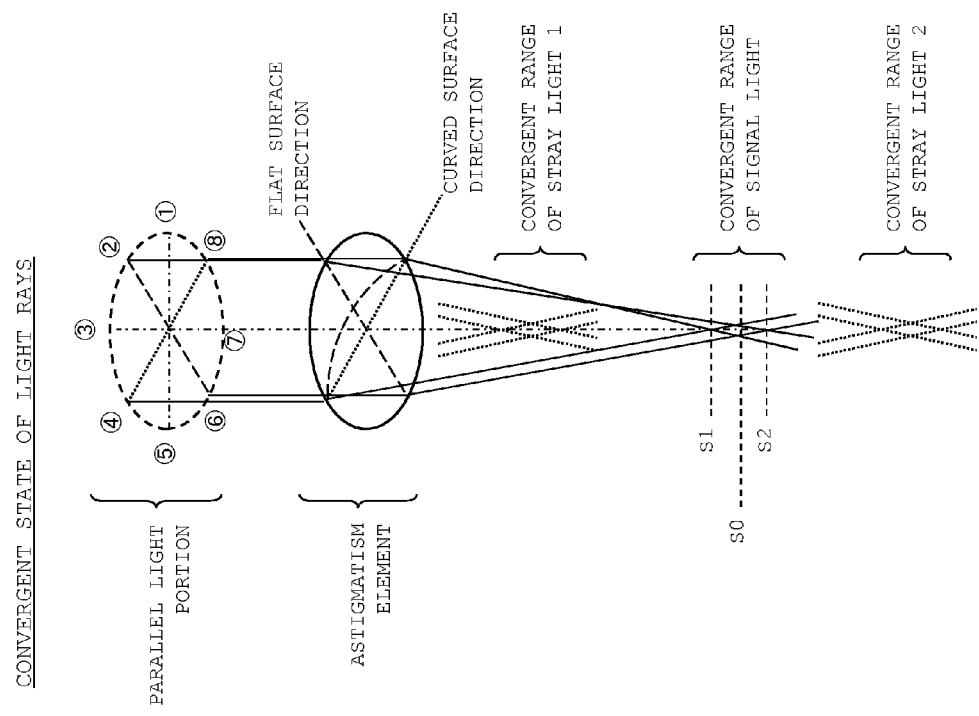

Sections (a) through (d) in FIG. 4B are diagrams respectively showing beam configurations and light ray passing positions of stray light 2 on the parallel light portion, and the planes S1, S0, and S2. As shown in the section (a) of FIG. 4B, similarly to the signal light, in the case where eight positions 1 through 8 are defined on the outer periphery of stray light 2, light rays passing the eight positions 1 through 8 on the parallel light portion are entered into the plane S0, without convergence into a focal line in the curved surface direction or a focal line in the flat surface direction. Accordingly, the light rays passing the positions 1 through 8 on the parallel light portion respectively pass the positions 1 through 8 shown in the section (c) of FIG. 4B on the plane S0.

Figure 5:
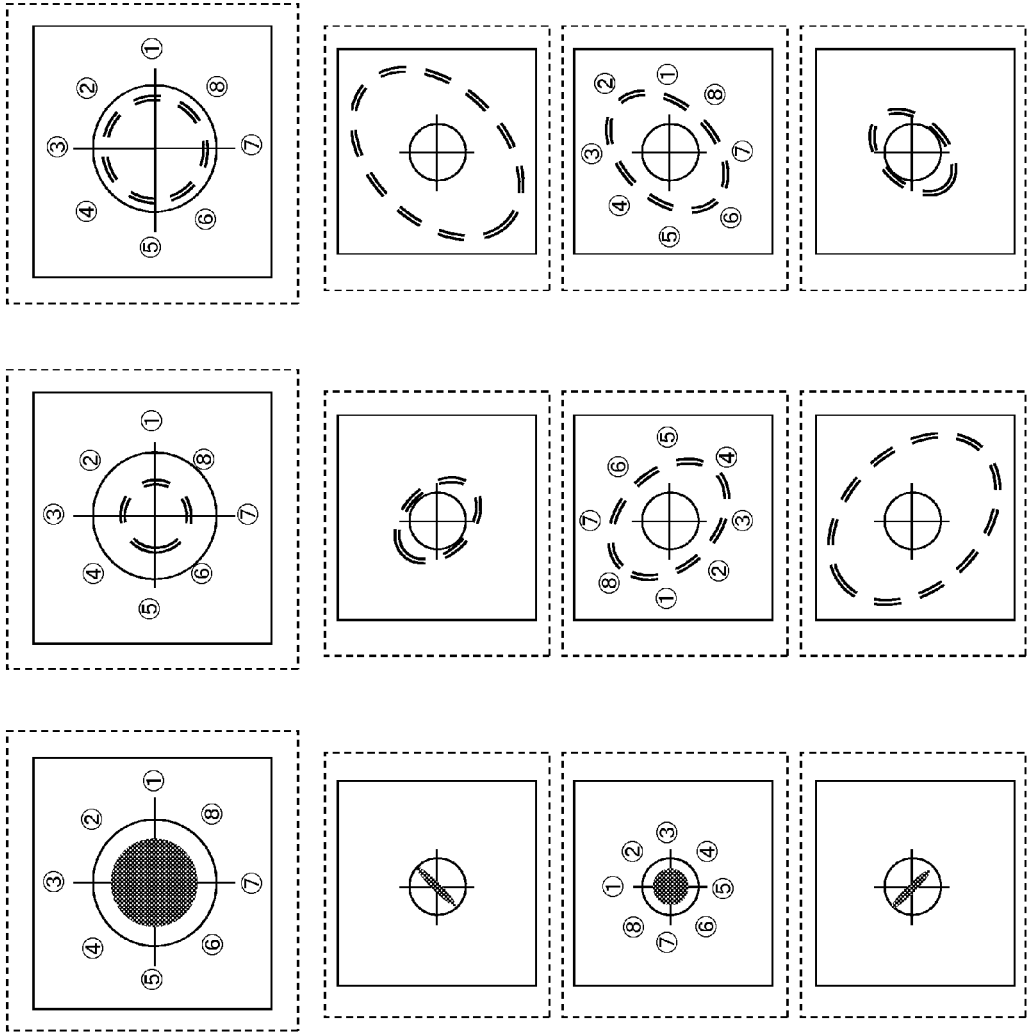
FIG. 5 is a diagram for describing the technical principle (as to how light rays propagate) in the embodiment.

FIG. 5 shows diagrams of the beam configurations and the light ray passing positions of signal light, stray light 1, and stray light 2 on the parallel light portion, and the planes S1, S0, and S2 in comparison with each other. As is obvious from the comparison between the diagrams in the section (c) of FIG. 5, light fluxes of signal light, stray light 1, and stray light 2 that have passed the position 1 on the parallel light portion respectively pass the different outer peripheral positions from each other on the plane S0. Likewise, light fluxes of signal light, stray light 1, and stray light 2 that have passed the positions 3, 4, 5, 7, and 8 on the parallel light portion respectively pass the different outer peripheral positions from each other on the plane S0. The light fluxes of signal light and stray light 2 that have passed the positions 2 and 6 on the parallel light portion respectively pass the corresponding same outer peripheral positions on the plane S0. In this case, the light fluxes of signal light and stray light 1 that have passed the positions 2 and 6 on the parallel light portion respectively pass the different outer peripheral positions from each other on the plane S0, and the light fluxes of stray light 1 and stray light 2 that have passed the positions 2 and 6 on the parallel light portion respectively pass the different outer peripheral positions from each other on the plane S0.

Next, a relation between an area dividing pattern of signal light, stray light 1, and stray light 2 on the parallel light portion, and an irradiation area of signal light, stray light 1, and stray light 2 on the plane S0 is investigated, considering the above phenomenon.

First, as shown in FIG. 6A, let it be assumed that signal light, stray light 1, and stray light 2 on the parallel light portion are each divided into four light flux areas A through D by two straight lines respectively inclined with respect to the flat surface direction and the curved surface direction by 45 degrees. This dividing pattern corresponds to an area dividing based on a conventional astigmatism method.

By the area dividing, signal light in the light flux areas A through D has a distribution on the plane S0 as shown in FIG. 6B due to the above phenomenon. Stray light 1 and stray light 2 in the light flux areas A through D respectively have distributions on the plane S0 as shown in FIGS. 6C and 6D due to the above phenomenon.

In this example, if the signal light, the stray light 1, and the stray light 2 on the plane S0 are extracted with respect to each of the light flux areas, distributions of the signal light, the stray light 1, and the stray light 2 are as shown in FIGS. 7A through 7D. In this case, the signal light in each of the light flux areas is necessarily superimposed on one of the stray light 1 and the stray light 2 in the corresponding same light flux area. Specifically, as shown in FIG. 1A, in the case where the rearward focal point is positioned on the target recording layer, as shown in FIGS. 7A and 7D, signal light passing the light flux areas A and D, and stray light 1 are superimposed with each other; and as shown in FIG. 1B, in the case where the forward focal point is positioned on the target recording layer, as shown in FIGS. 7B and 7C, signal light passing the light flux areas B and C, and stray light 2 are superimposed with each other. Thus, in any of the cases, signal light in two light flux areas, and stray light in the corresponding light flux area are simultaneously entered. As a result, a detection signal may be deteriorated.

In contrast, as shown in FIG. 8A, let it be assumed that signal light, stray light 1, and stray light 2 on the parallel light portion are each divided into four light flux areas A through D by two straight lines, which are respectively in parallel to the flat surface direction and the curved surface direction. Then, signal light in the light flux areas A through D has a distribution on the plane S0 as shown in FIG. 8B due to the above phenomenon. Stray light 1 and stray light 2 in the light flux areas A through D respectively have distributions on the plane S0, as shown in FIGS. 8C and 8D due to the above phenomenon.

In this example, if the signal light, the stray light 1, and the stray light 2 on the plane S0 are extracted with respect to each of the light flux areas, distributions of the signal light, the stray light 1, and the stray light 2 are as shown in FIGS. 9A through 9D. In this case, the signal light in each of the light flux areas is not superimposed with any one of the stray light 1 and the stray light 2 in the corresponding light flux area. Accordingly, if only the signal light is allowed to be received by a sensing portion, after the light fluxes (of signal light, stray light 1, and stray light 2) in each of the light flux areas are dispersed in different directions from each other, only the signal light is allowed to be entered into the corresponding sensing portion to thereby prevent incidence of stray light. Thus, deterioration of a detection signal resulting from stray light can be avoided.

As described above, dividing signal light, stray light 1, and stray light 2 each into four light flux areas A through D by two straight lines, which are respectively in parallel to the flat surface direction and the curved surface direction, and dispersing the light passing through the light flux areas A through D away from each other on the plane S0 enables to extract only the signal light. This embodiment is made based on the above principle.

FIGS. 10B and 10C are diagrams showing distribution states of signal light, stray light 1, and stray light 2 on the plane S0, in the case where propagating directions of light fluxes (of signal light, stray light 1, and stray light 2) passing the four light flux areas A through D shown in FIG. 8A are changed from each other by a predetermined angle. In this example, as shown in FIG. 10A, the propagating directions of light fluxes (of signal light, stray light 1, and stray light 2) passing the four light flux areas A through D are respectively changed into directions Da, Db, Dc, and Dd by a predetermined angle amount α (not shown). The directions Da, Db, Dc, and Dd are inclined with respect to each of the flat surface direction and the curved surface direction by 45 degrees.

In the above arrangement, it is possible to distribute a light flux only including signal light and stray light 1, and a light flux only including signal light and stray light 2, on the plane S0, by adjusting the angle amount α with respect to the directions Da, Db, Dc, and Dd, as shown in FIGS. 10B and 10C, respectively. Specifically, in the case where a rearward focal point is positioned on the target recording layer, as shown in FIG. 1A, signal light and stray light 1 have a distribution on the plane S0, as shown in FIG. 10B; and in the case where a forward focal point is positioned on the target recording layer, as shown in FIG. 1B, signal light and stray light 2 have a distribution on the plane S0, as shown in FIG. 10C. Thus, in any of the cases, as shown in FIGS. 10B and 10C, it is possible to set a signal light area where only signal light exists on the plane S0. It is possible to receive only signal light in the respective light flux areas on a corresponding sensing portion, by setting the sensing portions of the photodetector on the signal light area.

Figure 11A:
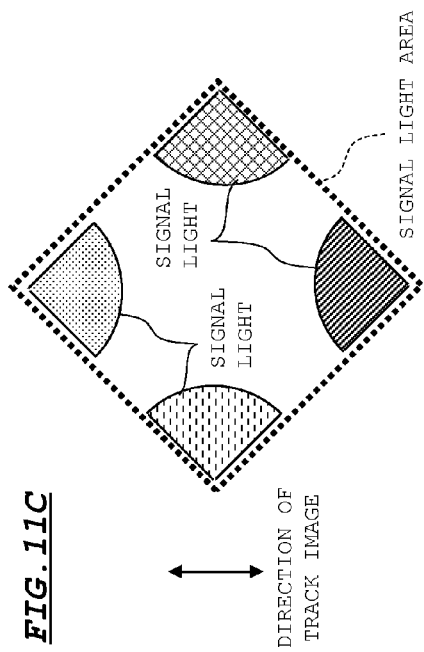
FIGS. 11A through 11D are diagrams showing a disposition method of a sensor layout in the embodiment.
Figure 11C:
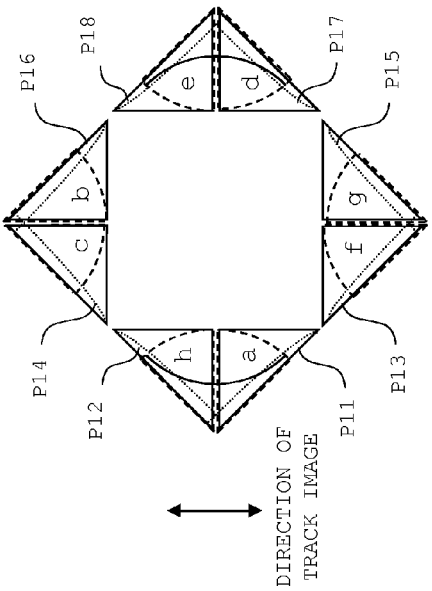
Figure 11B:
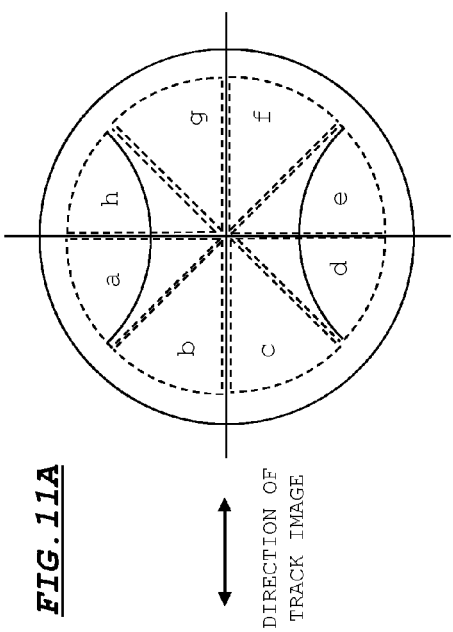
Figure 11D:
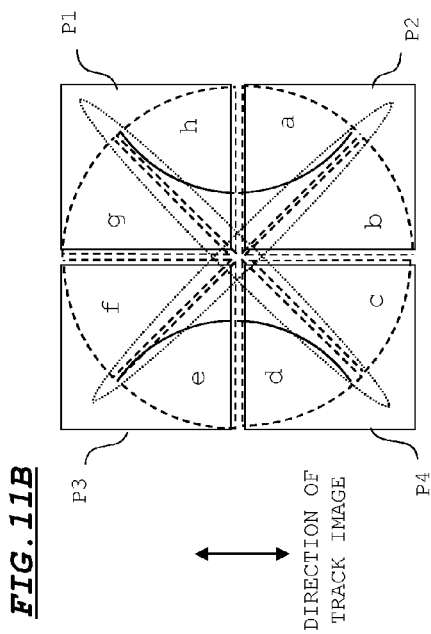

FIGS. 11A through 11D are diagrams for describing a method for arranging a sensing portion. FIGS. 11A and 11B are diagrams showing a light flux dividing method and a sensing portion based on a conventional astigmatism method. FIGS. 11C and 11D are diagrams showing a light flux dividing method and a sensing portion based on the above principle. In this example, a track direction is inclined with respect to each of the flat surface direction and the curved surface direction by 45 degrees. To simplify the description, a light flux is divided into eight light flux areas "a" through "h" in FIGS. 11A and 11B. Diffraction images (track images) by a track groove are indicated by the solid lines, and beam configurations in an out-of-focus state are indicated by the dotted lines in FIGS. 11A and 11B.

It is known that a superimposed state of a zero-th order diffraction image and a first order diffraction image of signal light resulting from a track groove is obtained by (track pitch× NA of objective lens). As shown in FIGS. 11A, 11B, and 11D, a condition for forming a first order diffraction image within the four light flux areas "a", "d", "e", and "h" is expressed by: wavelength/(track pitch×NA of objective lens)>√2.

In the conventional astigmatism method, sensing portions P1 through P4 (a four-division sensor) of a photodetector are set as shown in FIG. 11B. In this arrangement, assuming that detection signal components based on the light intensities of the light flux areas "a" through "h" are expressed by A through H, a focus error signal FE and a push-pull signal PP are obtained by the equations (1) and (2).

$$FE=(A+B+E+F)-(C+D+G+H) \quad (1)$$

$$PP=(A+B+G+H)-(C+D+E+F) \quad (2)$$

On the other hand, in the distribution states shown in FIGS. 10B and 10C, as described above, signal light is distributed in the state as shown in FIG. 11C within the signal light area. In this case, the signal light passing the light flux areas "a" through "h" in FIG. 11A is as shown in FIG. 11D. Specifically, the signal light passing the light flux areas "a" through "h" in FIG. 11A is guided to the light flux areas "a" through "h" shown in FIG. 11D on the plane S0 where the sensing portion of the photodetector is disposed.

Accordingly, setting the sensing portions P11 through P18 at the positions of the light flux areas "a" through "h" shown in FIG. 11D in the superimposed state shown in FIG. 11D enables to generate a focus error signal and a push-pull signal by performing the same computation as applied in FIG. 11B. Specifically, assuming that detection signals from the sensing portions which receive light fluxes in the light flux areas "a" through "h" are expressed by A through H, similarly to the arrangement shown in FIG. 11B, a focus error signal FE and a push-pull signal PP can be obtained by performing computation in accordance with the equation (1) and (2).

As described above, according to the above principle, dividing reflection light from a disc into the four light flux areas A through D by two straight lines in parallel to the flat surface direction and the curved surface direction, as shown in FIG. 10A; and dispersing the light passing the light flux areas A through D, as shown in FIG. 10A enables to generate a signal light area where only signal light exists. Then, it is possible to individually receive only signal light by the respective sensing portions, by disposing the sensing portions P11 through P18 shown in FIG. 11D on the signal light area. Accordingly, it is possible to generate a focus error signal and a push-pull signal (tracking error signal) with high precision, based on reflection light (signal light) from the target recording layer shown in FIGS. 1A and 1B, by a computation processing substantially equivalent to the computation processing based on the conventional astigmatism method.

Example 1

In the following, example 1 based on the above principle is described. Example 1 is an example, wherein the invention is applied to an optical pickup device compatible with BD, DVD, and CD.

Figure 12:
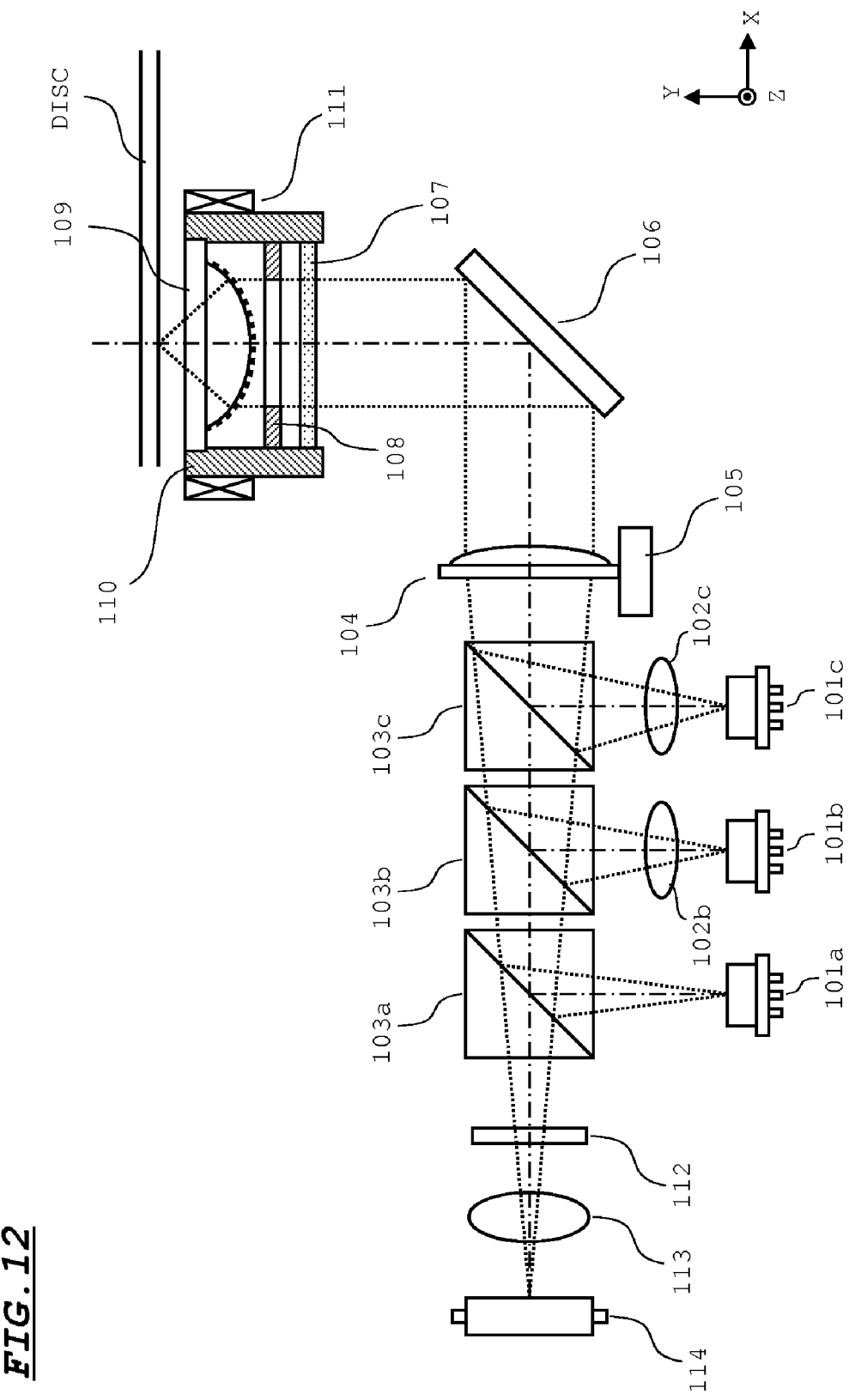
FIG. 12 is a diagram showing an optical system in an optical pickup device as example 1.

FIG. 12 is a diagram showing an optical system in the optical pickup device as example 1.

As shown in FIG. 12, the optical system in the optical pickup device is provided with semiconductor lasers 101a through 101c, divergent lenses 102b and 102c, polarized beam splitters 103a through 103c, a collimator lens 104, a lens actuator 105, a rise-up mirror 106, a quarter wavelength plate 107, an aperture 108, an objective lens 109, a holder 110, an objective lens actuator 111, an angle adjuster 112, a detection lens 113, and a photodetector 114.

Each of the semiconductor lasers 101a through 101c emit laser light for BD (wavelength: 405 nm), laser light for DVD (wavelength; 660 nm), and laser light for CD (wavelength: 785 nm). Further, the semiconductor lasers 101a through 101c are selectively used depending on a disc to be recorded/reproduced.

The divergent lenses 102b and 102c adjust divergence angles of laser light for DVD and laser light for CD in such a manner that laser light for DVD and laser light for CD which have been emitted from the semiconductor lasers 101b and 101c are converged on the photodetector 114 in the similar manner as laser light for BD which has been emitted from the semiconductor laser 101a.

The polarized beam splitters 103a through 103c substantially totally reflect laser light (S-polarized light) to be entered from the semiconductor lasers 101a through 101c, and substantially totally transmit laser light (P-polarized light) to be entered from the direction of the collimator lens 104.

The collimator lens 104 changes the divergence angle of laser light of the respective wavelengths to be entered from the side of the polarized beam splitter 103c, depending on the specifications (magnifications for the respective wavelengths) of the objective lens 109 with respect to laser light of the respective wavelengths. For instance, in the case where laser light for BD or laser light for DVD is used, the collimator lens 104 is positioned at a position where the laser light for BD or the laser light for DVD is entered into the objective lens 109 as an infinite system (parallel light). Further, in the case where laser light for CD is used, the collimator lens 104 is positioned at a position where the laser light for CD is entered into the objective lens 109 as a definite system (diffusion light).

As described above, the lens actuator 105 changes the position of the collimator lens 104 with respect to each of the wavelengths, and displaces the collimator lens 104 in the optical axis direction in accordance with a servo signal. Thus, an aberration generated in laser light of the respective wavelengths is corrected. The rise-up mirror 106 reflects the laser light of the respective wavelengths which has been entered from the side of the collimator lens 104 in a direction toward the objective lens 109.

The quarter wavelength plate 107 converts the laser light of the respective wavelengths directed to a disc into circularly polarized light, and converts the reflection light from the disc into linearly polarized light in a polarization direction orthogonal to the polarization direction of laser light directed toward the disc. As a result of the above operation, the laser light of the respective wavelengths reflected on the disc is transmitted through the polarized beam splitters 103a through 103c. The aperture 108 adjusts the beam shape of laser light of the respective wavelengths into a circular shape to optimize the effective diameter of laser light of the respective wavelengths with respect to the objective lens 109. The aperture 108 is formed with a reflection film having a wavelength selectivity to cut a circumference only to laser light with a predetermined wavelength.

The objective lens 109 is formed with a blazed diffraction grating (hologram) on an incident surface (surface on the side of the aperture 108), and is designed to properly converge laser light of the respective wavelengths on a target recording layer in a disc corresponding to the respective wavelengths. The arrangement of the objective lens 109 will be described later referring to FIGS. 13A through 13D.

The holder 110 integrally holds the quarter wavelength plate 107, the aperture 108, and the objective lens 109. The objective lens actuator 111 is constituted of a conventional well-known electromagnetic drive circuit. A coil portion such as a focus coil of the electromagnetic drive circuit is mounted on the holder 110.

The angle adjuster 112 is constituted of a multifaceted prism, and changes the propagating directions of laser light of the respective wavelengths which has been entered from the side of the polarized beam splitter 103a in the manner as described referring to FIG. 10A. Specifically, the angle adjuster 112 changes the propagating directions of light fluxes (signal light and stray light) passing the light flux areas A through D shown in FIG. 10A into the directions Da through Dd by the certain angle amount α, respectively. The angle amount α is set to such a value that the distribution state of signal light and stray light on the plane S0 is coincident with the distribution state shown in FIG. 10B or FIG. 10C. The arrangement of the angle adjuster 112 will be described later referring to FIGS. 14A and 14B.

The detection lens 113 imparts astigmatism to the laser light of the respective wavelengths which has been entered from the side of the angle adjuster 112. Specifically, the detection lens 113 corresponds to the astigmatism element shown in FIG. 2A. The detection lens 113 is disposed with an inclination of 45° in the flat surface direction and in the curved surface direction with respect to a track image from a disc.

The photodetector 114 has the sensing portions as shown in FIG. 11D. The photodetector 114 is disposed at such a position that the sensing portions are aligned with the position of the plane S0 shown in FIG. 2A. The photodetector 114 is provided with the eight sensing portions P11 through P18 shown in FIG. 11D. The sensing portions P11 through P18 receive light fluxes of laser light of the respective wavelengths passing the light flux areas "a" through "h" shown in FIG. 11D.

Detection signals to be outputted form the sensing portions P11 through P18 of the photodetector 114 are subjected to computation expressed by the equations (1) and (2) by a signal computing circuit (not shown) provided posterior to the photodetector 114, whereby a focus error signal and a push-pull signal are generated. Further, the signal computing circuit generates a reproduction RF signal by summing up the detection signals outputted from the eight sensing portions.

FIGS. 13A through 13D are diagrams for describing an arrangement of the objective lens 109.

FIG. 13A is a schematic diagram of a blazed hologram pattern. In a blazed diffraction grating, the diffraction efficiency is adjusted by the blaze height H, and the diffraction angle is adjusted by the pitch W.

FIG. 13B is a diagram showing a relation between the blaze height and the diffraction efficiency in a blazed diffraction grating. The blaze height H of a blazed diffraction grating formed on an incident surface of the objective lens 109 in this example is set in the "set value" shown in FIG. 13B. In this arrangement, the diffraction efficiency of third-order diffraction light of laser light for BD (wavelength: 405 nm) is about 100%, the diffraction efficiency of second-order diffraction light of laser light for DVD (wavelength: 660 nm) is about 87%, and the diffraction efficiencies of first-order diffraction light and second-order diffraction light of laser light for CD (wavelength: 785 nm) are about 41%.

When the laser light of the respective wavelengths is transmitted through the blazed diffraction grating having the above arrangement, the diffraction efficiency of diffraction light other than third-order diffraction light of laser light for BD, the diffraction efficiency of diffraction light other than second-order diffraction light of laser light for DVD, and the diffraction efficiencies of first-order diffraction light and second-order diffraction light of laser light for CD are significantly reduced. Accordingly, the laser light of the respective wavelengths which has been transmitted through the blazed diffraction grating can be regarded solely as third-order diffraction light in the case of laser light for BD, solely as second-order diffraction light in the case of laser light for DVD, and solely as first-order diffraction light and second-order diffraction light in the case of laser light for CD.

FIG. 13C is a diagram showing a diffraction angle by a blazed diffraction grating formed on an incident surface of the objective lens 109. As shown in FIG. 13C, the diffraction angles of first-order diffraction light and second-order diffraction light of laser light for CD, and the diffraction angle of third-order diffraction light of laser light for BD are different from each other, based on a relation between the wavelengths of the laser light. Further, the diffraction angle of second-order diffraction light (not shown) of laser light for DVD is different from the diffraction angle of third-order diffraction light of laser light for BD, and the diffraction angles of first-order diffraction light and second-order diffraction light of laser light for CD. The diffraction angle of the blazed diffraction grating is adjusted by the pitch W to optimize the focus positions to be described later.

FIG. 13D is a diagram showing focus positions of laser light for BD and laser light for CD. As described above, when a blazed diffraction grating is formed, the focal point of third-order diffraction light of laser light for BD, and the focal points of first-order diffraction light and second-order diffraction light of laser light for CD by the objective lens 109 are separated from each other in the optical axis direction, as shown in FIG. 13D. In this arrangement, the focal point of first-order diffraction light of laser light for CD is used as a focal point for CD, and the focal point of second-order diffraction light of laser light for CD is not necessary. Further, the focal point (not shown) of second-order diffraction light of laser light for DVD is also positioned at a different position in the optical axis direction with respect to the focal point for CD and the focal point for BD. Thus, the focal points of laser light of the respective wavelengths corresponding to BD, DVD, and CD are positioned on a recording layer in a disc corresponding to the respective wavelengths, whereby a recording/reproducing operation with respect to a disc is performed.

In the case where a recording/reproducing operation is performed for CD, if the focal point of first-order diffraction light of laser light for CD is positioned on a recording layer, second-order diffraction light of laser light for CD which has been reflected on the recording layer becomes stray light. In this case, as shown in the above principle (see FIG. 1A), the second-order diffraction light (stray light) of laser light for CD which has been reflected on the CD can be regarded as reflection light (stray light 1) from a rearward imaginary recording layer with respect to the target recording layer.

In the case where a recording/reproducing operation is performed for BD or DVD, as described above, since the diffraction efficiency of diffraction light other than the laser light to be focused is low, there is no or less likelihood that stray light may be generated. BD or DVD has one or two recording layers. In the case where BD or DVD has a single recording layer, there is no likelihood that reflection light (stray light) from a layer other than the target recording layer may be generated. In the case where BD or DVD has two recording layers, as described in the above principle (see FIG. 2A), if light is focused on the forward recording layer, reflection light (stray light 1) from the rearward recording layer is generated; and if light is focused on the rearward recording layer, reflection light (stray light 2) from the forward recording layer is generated.

Figure 14B:
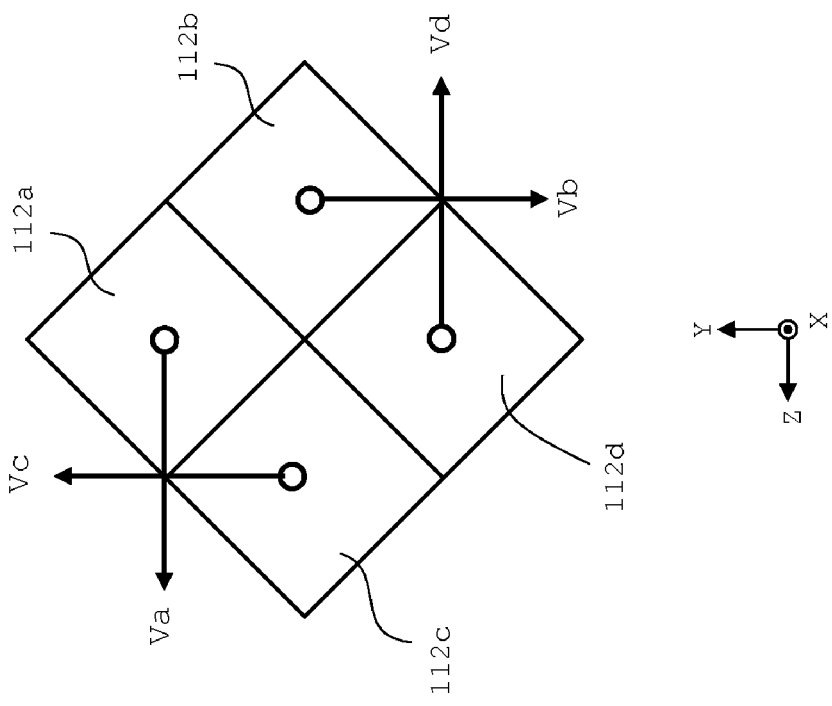
FIGS. 14A and 14B are diagrams showing an arrangement example of an angle adjuster in example 1.
Figure 14A:
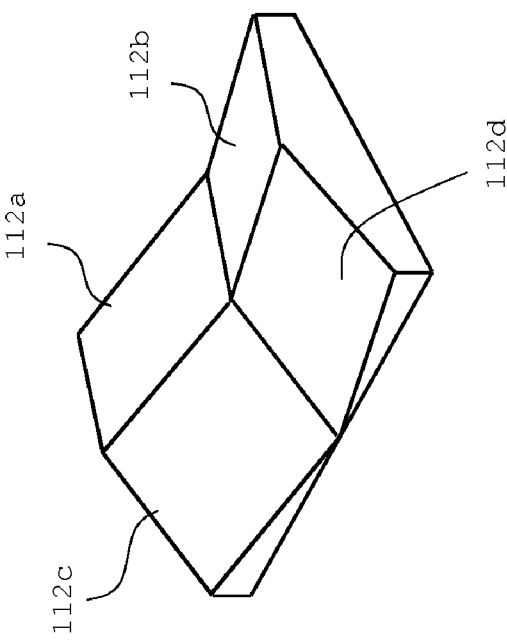

FIGS. 14A and 14B are diagrams showing an arrangement example of the angle adjuster 112. FIG. 14A is a perspective view of the angle adjuster 112, and FIG. 14B is a diagram when viewed from the side of a light incident surface of the angle adjuster 112.

Referring to FIG. 14A, the angle adjuster 112 is made of a transparent member having a flat light output surface, and a light incident surface with four areas individually tilted in different directions. Four tilted surfaces 112a through 112d are formed on the light incident surface of the angle adjuster 112.

Referring to FIG. 14B, the angle adjuster 112 is disposed at a position posterior to the polarized beam splitter 103a so that laser light (signal light and stray light) that has passed the light flux areas A through D shown in FIG. 10A is entered into the four tilted surfaces 112a through 112d.

When laser light (signal light and stray light) of the respective wavelengths is entered from the side of the incident surface of the angle adjuster 112, the propagating directions of laser light (signal light and stray light) of the respective wavelengths are changed into directions Va through Vd by refraction at the time of incidence into the tilted surfaces 112a through 112d. The directions Va through Vd coincide with the directions Da through Dd shown in FIG. 10A.

Further, the refraction angles with respect to the tilted surfaces 112a through 112d are adjusted so that laser light (signal light and stray light) of the respective wavelengths which has been transmitted through the tilted surfaces 112a through 112d has a distribution as shown in FIG. 10B or 10C, on the plane S0 shown in FIG. 2A. Accordingly, it is possible to properly receive corresponding signal light on the eight sensing portions, by disposing the photodetector 114 having the sensing portions shown in FIG. 11D, on the plane S0. The refraction angles of laser light (signal light and stray light) of the respective wavelengths are slightly different from each other depending on a wavelength difference. However, since the refraction angle difference is negligibly small, it is possible to receive signal light of the respective wavelengths by a single sensor layout.

As described above, in this example, reflection light (stray light) of second-order diffraction light of laser light for CD which has been reflected on a recording layer can be regarded as reflection light (stray light 1) from the rearward imaginary recording layer with respect to the target recording layer. In this state, based on the above principle, the distribution of reflection light (signal light) of first-order diffraction light of laser light for CD, and reflection light (stray light 1) from the imaginary recording layer on the light receiving surface (plane S0) has the state as shown in FIG. 10B. Accordingly, it is possible to receive only the corresponding signal light on the sensing portions P11 through P18, by disposing the sensing portions shown in FIG. 11D on the signal light area shown in FIG. 10B. This enables to suppress deterioration of a detection signal resulting from stray light.

In this example, in the case where a recording/reproducing operation is performed for BD (DVD) having two layers, reflection light from a recording layer other than the target recording layer becomes stray light. In this case, the distribution of reflection light (signal light and stray light) of laser light for BD (DVD) on the light receiving surface (plane S0) has the state as shown in FIG. 10B or 10C, based on the above principle. Accordingly, it is possible to receive only corresponding signal light on the respective corresponding sensing portions P11 through P18, by disposing the sensing portions shown in FIG. 11D on the signal light area shown in FIG. 10B or 10C. This enables to suppress deterioration of a detection signal resulting from stray light.

Further, the above advantages can be obtained by merely disposing the angle adjuster 112 on an optical path of laser light reflected on a disc, specifically, between the polarized beam splitter 103a and the detection lens 113 in the arrangement shown in FIG. 12. Accordingly, in this example, it is possible to effectively remove influence by stray light with a simplified arrangement. Further, in the arrangement shown in FIG. 12, the angle adjuster 112 is disposed between the polarized beam splitter 103a and the detection lens 113. Alternatively, the angle adjuster 112 may be disposed between the detection lens 113 and the photodetector 114.

Figure 15:
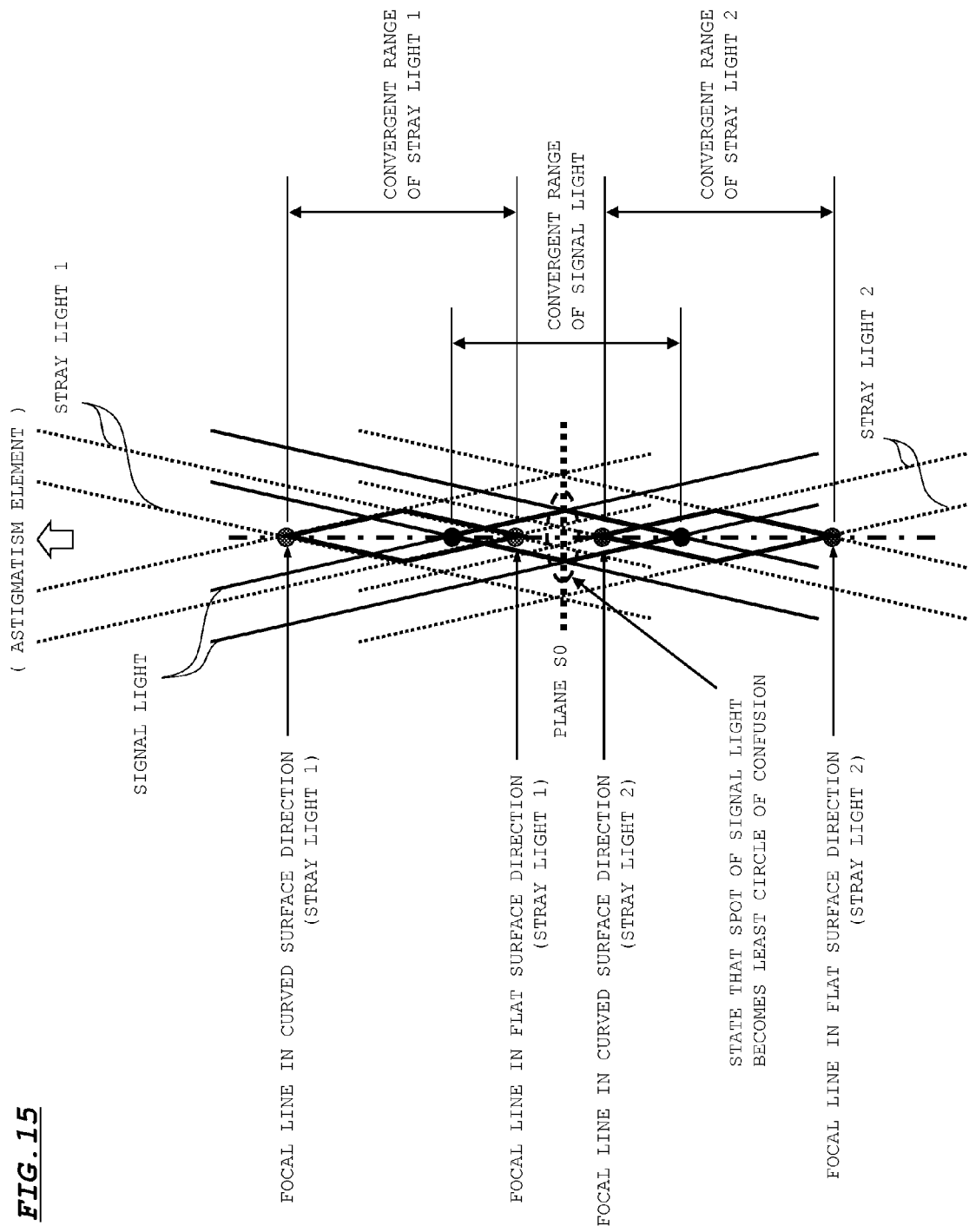
FIG. 15 is a diagram showing an inventive example, and a preferred application range of the technical principle of the invention.

The effect of removing stray light based on the above principle is obtained, as shown in FIG. 15, when the focal line position of stray light 1 in the flat surface direction is closer to the astigmatism element with respect to the plane S0 (a plane where the beam spot of signal light becomes a least circle of confusion), and the focal line position of stray light 2 in the curved surface direction is away from the astigmatism element with respect to the plane S0. Specifically, as far as the above relation is satisfied, the distribution of signal light, stray light 1, and stray light 2 can be made in the states as shown in FIGS. 10B and 10C, which enables to avoid a likelihood that signal light, stray light 1, and stray light 2 may be superimposed one over the other on the plane S0. In other words, as far as the above relation is satisfied, even if the focal line position of stray light 1 in the flat surface direction is moved closer to the plane S0 than the focal line position of signal light in the curved surface direction, or even if the focal line position of stray light 2 in the curved surface direction is moved closer to the plane S0 than the focal line position of signal light in the flat surface direction, the effect of the invention and the example based on the above principle can be obtained.

Example 2

In the following, example 2 based on the above principle is described. Example 2 is an example, wherein the invention is applied to an optical pickup device compatible with BD and a next-generation optical disc. The next-generation optical disc in this example is an optical disc to be recorded/reproduced by using laser light having the same wavelength as the wavelength of laser light for BD, and an objective lens having a larger NA than the NA of BD.

Figure 16B:
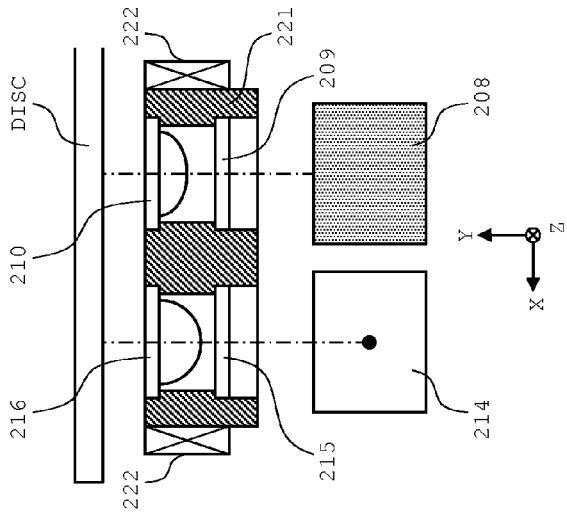
FIGS. 16A through 16C are diagrams showing an optical system in an optical pickup device as example 2.
Figure 16C:
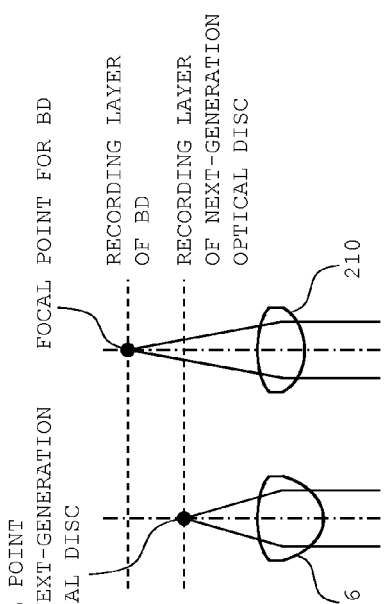
Figure 16A:
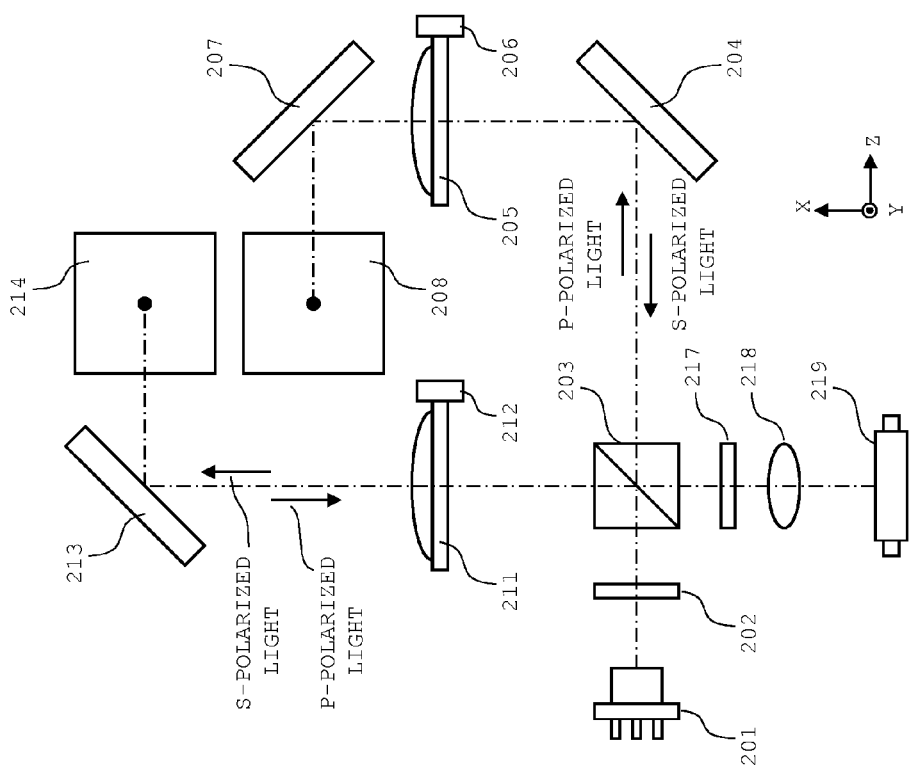

FIGS. 16A through 16C are diagrams showing an optical system in the optical pickup device in this example. FIG. 16A is a plan view of the optical system in the optical pickup device, and FIG. 16B is a side view of a portion posterior to rise-up mirrors 208 and 214 shown in FIG. 16A, when viewed from plus X-axis direction in FIG. 16A. In FIG. 16B, an objective lens holder 221 is illustrated by a cross-sectional view to show the inner structure of the objective lens holder 221.

In FIGS. 16A and 16B, a semiconductor laser 201 emits laser light of wavelength 405 nm. A half wavelength plate 202 is disposed to adjust the polarization direction of laser light with respect to a polarized beam splitter 203. The half wavelength plate 202 is disposed at such a position that the polarization direction of laser light with respect to the polarized beam splitter 203 is aligned in a direction of 45° with respect to P-polarized light and S-polarized light.

The polarized beam splitter 203 transmits or reflects laser light to be entered from the side of the semiconductor laser 201, depending on the polarization direction of the laser light. In this example, as described above, since the polarization direction of laser light with respect to the polarized beam splitter 203 is aligned in a direction of 45° with respect to P-polarized light and S-polarized light by the half wavelength plate 202, one half of the laser light from the semiconductor laser 201 is transmitted through the polarized beam splitter 203, and the other half thereof is reflected on the polarized beam splitter 203.

The laser light transmitted through the polarized beam splitter 203 is reflected on a mirror 204, and then entered into a collimator lens 205. The collimator lens 205 converts laser light to be entered from the side of the polarized beam splitter 203 into parallel light. A lens actuator 206 displaces the collimator lens 205 in the optical axis direction in accordance with a servo signal. As a result of the above operation, an aberration generated in the laser light is corrected. The laser light transmitted through the collimator lens 205 is reflected on a mirror 207, and then reflected in a direction toward an objective lens 210 for BD by the rise-up mirror 208.

A quarter wavelength plate 209 converts laser light reflected on the rise-up mirror 208 into circularly polarized light, and also converts reflection light from a disc into linearly polarized light (S-polarized light) in a polarization direction orthogonal to the polarization direction of laser light toward the disc. As a result of the above operation, the laser light reflected on the disc is reflected on the polarized beam splitter 203, and guided to a photodetector 219. The objective lens 210 for BD is designed to properly converge laser light entered from the side of the quarter wavelength plate 209 on BD.

Out of the laser light emitted from the semiconductor laser 201, laser light reflected on the polarized beam splitter 203 is entered into a collimator lens 211. The collimator lens 211 converts laser light to be entered from the side of the polarized beam splitter 203 into parallel light. A lens actuator 212 displaces the collimator lens 211 in the optical axis direction in accordance with a servo signal. As a result of the above operation, an aberration generated in the laser light is corrected. The laser light transmitted through the collimator lens 211 is reflected on a mirror 213, and then reflected in a direction toward an objective lens 216 for a next-generation optical disc by the rise-up mirror 214.

A quarter wavelength plate 215 converts laser light reflected on the rise-up mirror 214 into circularly polarized light, and converts reflection light from a disc into linearly polarized light (P-polarized light) in a polarization direction orthogonal to the polarization direction of laser light toward the disc. As a result of the above operation, the laser light reflected on the disc is transmitted through the polarized beam splitter 203 and guided to the photodetector 219. The objective lens 216 for a next-generation optical disc is designed to properly converge laser light entered from the side of the quarter wavelength plate 215 on a next-generation optical disc.

Reflection light (S-polarized light) from the side of the objective lens 210 for BD is reflected on the polarized beam splitter 203, and reflection light (P-polarized light) from the side of the objective lens 216 for a next-generation optical disc is transmitted through the polarized beam splitter 203. These two reflection light is simultaneously entered into an angle adjuster 217, in both of the cases where a recording/reproducing operation is performed for BD and a next-generation optical disc.

The angle adjuster 217, a detection lens 218, and the photodetector 219 have the same arrangements as those of the angle adjuster 112, the detection lens 113, and the photodetector 114 in example 1, respectively.

As shown in FIG. 16B, the two quarter wavelength plates 209 and 215, the objective lens 210 for BD, and the objective lens 216 for a next-generation optical disc are mounted in common on a holder 221. The holder 221 and an objective lens actuator 222 have the same arrangements as those of the holder 110 and the objective lens actuator 111 in example 1, respectively.

In this example, in the case where a recording/reproducing operation is performed for BD, laser light to be entered into the objective lens 210 for BD is focused on a recording layer of BD, and reflected on the recording layer as signal light. In performing the above operation, as shown in FIG. 16C, laser light to be entered into the objective lens 216 for a next-generation optical disc is focused at a forward position with respect to the recording layer of BD, and is reflected on the recording layer as stray light 1, as described in the above principle. Further, in the case where a recording/reproducing operation is performed for a next-generation optical disc, laser light to be entered into the objective lens 216 for a next-generation optical disc is focused on a recording layer of the next-generation optical disc, and reflected on the recording layer as signal light. In performing the above operation, as shown in FIG. 16C, since laser light to be entered into the objective lens 210 for BD is focused at a rearward position with respect to the recording layer of the next-generation optical disc, the laser light to be entered into the objective lens 210 for BD is reflected on the recording layer as stray light 2, as described in the above principle. Accordingly, in the case where a recording/reproducing operation is performed for BD and a next-generation optical disc, laser light to be entered from the side of the polarized beam splitter 203 into the angle adjuster 217 includes stray light 1 or stray light 2, in addition to signal light.

In the optical pickup device having the above arrangement, the distribution of reflection light from a disc on the light receiving surface (plane S0) has the state as shown in FIG. 10B or 10C, based on the above principle. Accordingly, it is possible to receive only signal light on the sensing portions P11 through P18, by disposing the sensing portions shown in FIG. 11D on the signal light area shown in FIG. 10B or 10C. This enables to suppress deterioration of a detection signal resulting from stray light.

In addition, in the case where a recording/reproducing operation is performed for BD having two layers or a next-generation optical disc having two layers, it is possible to regard reflection light other than reflection light (signal light) of laser light which is focused on a target recording layer, as stray light 1 or stray light 2, based on the above principle. In this case, if a forward recording layer is the target recording layer, signal light and stray light have a distribution as shown in FIG. 10B, on the light receiving surface (plane S0); and if a rearward recording layer is the target recording layer, signal light and stray light have a distribution as shown in FIG. 10C, on the light receiving surface (plane S0). Thus, in the above case, it is also possible to suppress deterioration of a detection signal resulting from stray light from the other recording layer.

The examples of the invention have been described as above, but the invention is not limited to the foregoing examples. Further, the embodiment of the invention may be changed or modified in various ways.

For instance, in the foregoing examples, the angle adjuster 112, 217 is constituted of a multifaceted prism. Alternatively, the angle adjuster 112, 217 may be constituted of a hologram element.

FIG. 17A is a diagram showing an arrangement example of an angle adjuster 300, in the case where the angle adjuster is constituted of a hologram element.

As shown in FIG. 17A, the angle adjuster 300 is made of a square-shaped transparent plate, and a hologram pattern is formed on a light incident surface of the angle adjuster 300. As shown in FIG. 17A, the light incident surface is divided into four hologram areas 300a through 300d. The angle adjuster 300 is disposed at such a position that laser light (signal light and stray light) passing the light flux areas A through D shown in FIG. 10A are entered into the four hologram areas 300a through 300d. A hologram to be formed in the hologram areas 300a through 300d may be of a blazed-type or a stepped-type.

The hologram areas 300a through 300d diffract laser light (signal light and stray light) entered into the angle adjuster 300 in directions Va through Vd. The directions Va through Vd coincide with the directions Da through Dd shown in FIG. 10A, respectively. The diffraction efficiencies of the each of the hologram areas are equal to each other.

FIG. 17B is a diagram showing sensor layouts to be formed on the photodetector 114, 219, in the case where the angle adjuster 300 shown in FIG. 17A is used. As shown in FIG. 17B, signal light of laser light of the respective wavelengths is received on sensor layouts 1 through 3 formed at inner positions of signal light areas 1 through 3.

In the above arrangement, the diffraction angles and the diffraction efficiencies of laser light of the respective wavelengths on the respective hologram areas are set so that the diffraction efficiency of diffraction light of a predetermined order is set to an intended value. Specifically, the diffraction angles and the diffraction efficiencies of the respective hologram areas are adjusted so that signal light of the respective wavelengths which has been transmitted through the angle adjuster 300 is entered into either one of the sensor layouts 1 through 3. For instance, signal light of laser light for BD is entered into the innermost sensor layout 3, signal light of laser light for CD is entered into the outermost sensor layout 1, and signal light of laser light for DVD is entered into the intermediate sensor layout 2.

With the angle adjuster 300 and the sensor layouts of the photodetector 114, 219 having the above arrangement, at the time of a recording/reproducing operation with respect to a disc, high-precision detection signals based on signal light are obtained, based on detection signals to be outputted from the respective sensing portions shown in FIG. 17B in the similar manner as the foregoing examples.

Further, in the case where the angle adjuster 300 shown in FIG. 17A is used, sensor layouts shown in FIG. 17C may be used. As shown in FIG. 17C, a sensor layout 3 is constituted of a conventional four-division sensor. The sensor layout 3 receives laser light (zero-th order diffraction light) which is not diffracted by the angle adjuster 300. In this modification, the diffraction angles and the diffraction efficiencies of the respective hologram areas are also adjusted so that signal light of the respective wavelengths which has been transmitted through the angle adjuster 300 is entered into either one of the sensor layouts 1 through 3.

Furthermore, in the foregoing examples, the angle adjuster 112, 217 has only a refraction function i.e. an angle imparting function of changing the propagating directions of laser light by a predetermined angle. Alternatively, the angle adjuster 112, 217 may be formed with a lens surface having an astigmatism function by the detection lens 113, 218, in addition to the angle imparting function. Further alternatively, the respective tilted surfaces of the angle adjuster 112, 217 may be formed into a curved surface to provide each of the tilted surfaces with a lens function of imparting astigmatism. Similarly, in the angle adjuster 300 shown in FIG. 17A, hologram areas 300a through 300d may be formed with a hologram pattern having an astigmatism function by the detection lens 113, 218, in addition to the angle imparting function. Further alternatively, a hologram pattern having the angle imparting function may be formed on a light incident surface of the angle adjuster 300, and a hologram pattern having an astigmatism function may be formed on a light output surface of the angle adjuster 300. The modification is advantageous in omitting the detection lens 113 or 218, and reducing the number of parts and the production cost.

Furthermore, in example 1, laser light corresponding to BD, DVD, and CD is emitted from three different laser light sources (semiconductor lasers 101a through 101c). Alternatively, one or two laser light sources may emit laser light corresponding to the discs of the above three kinds. The modification enables to configure an optical system, wherein the optical axis of laser light to be emitted from another laser element which is disposed in the laser light source is aligned with the optical axis of laser light to be emitted from the laser light source at the time incidence into the angle adjuster 112.

Furthermore, in example 1, at the time of a recording/reproducing operation for CD, laser light to be converged by an objective lens is focused at two different positions. Alternatively, even in the case where laser light to be converged by an objective lens is focused at three or more different positions, it is possible to suppress deterioration of a detection signal resulting from stray light. Specifically, in the case where three focal points are formed, if light is focused at the middle focal point on a recording layer, reflection light of laser light to be converged at the forward focal point and the rearward focal point is regarded as stray light 1 and stray light 2. Accordingly, in this case, it is also possible to retract stray light 1 and stray light 2 from a signal light area, and suppress deterioration of a detection signal resulting from stray light, based on the above principle.

Furthermore, in example 1, two focal points are formed by forming a diffraction surface on an incident surface of the objective lens 109. Alternatively, a diffraction surface may be formed on an output surface of the objective lens 109, in place of the incident surface of the objective lens 109; or a diffraction element other than the objective lens 109 may be disposed. Similarly to example 1, the above modification is also advantageous in suppressing deterioration of a detection signal resulting from stray light, even in the case where two or more focal points are formed. In other words, the invention is advantageous in the case where plural focal points are formed by a diffraction surface included in an optical system.

Furthermore, in example 1, two focal points are formed by forming a diffraction surface on the entirety of the incident surface of the objective lens 109. Similarly to example 1, forming a diffraction surface on a part of a lens aperture is advantageous in suppressing deterioration of a detection signal resulting from stray light, even in the case where two focal points are formed.

Furthermore, in example 2, at the time of a recording/reproducing operation for BD or a next-generation optical disc, laser light to be converged by two objective lenses is focused at two different positions. Alternatively, it is possible to suppress deterioration of a detection signal resulting from stray light, even in the case where laser light to be converged by three objective lenses is focused at three different positions.

Furthermore, in the foregoing examples, even in the case where a recording/reproducing operation is performed with respect to a multilayer disc having three or more layers, it is possible to suppress deterioration of a detection signal resulting from stray light. Specifically, reflection light other than reflection light (signal light) of laser light which is focused on a target recording layer can be regarded as stray light 1 and stray light 2, based on the above principle. Accordingly, the above modification is also advantageous in suppressing deterioration of a detection signal resulting from stray light.

Furthermore, in example 2, the optical pickup device is made compatible with BD and a next-generation optical disc by allowing incidence of laser light into two objective lenses. Alternatively, the optical pickup device may be configured to be compatible with BD, and a next-generation optical disc which requires an NA different from the NA of BD by allowing incidence of laser light into a single objective lens.

Figure 18A:
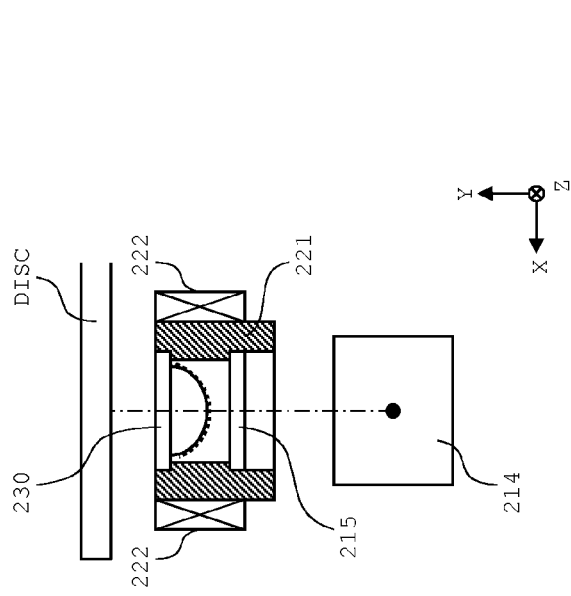
FIGS. 18A through 18C are diagrams showing an optical system in an optical pickup device as a modification example in the embodiment.
Figure 18B:
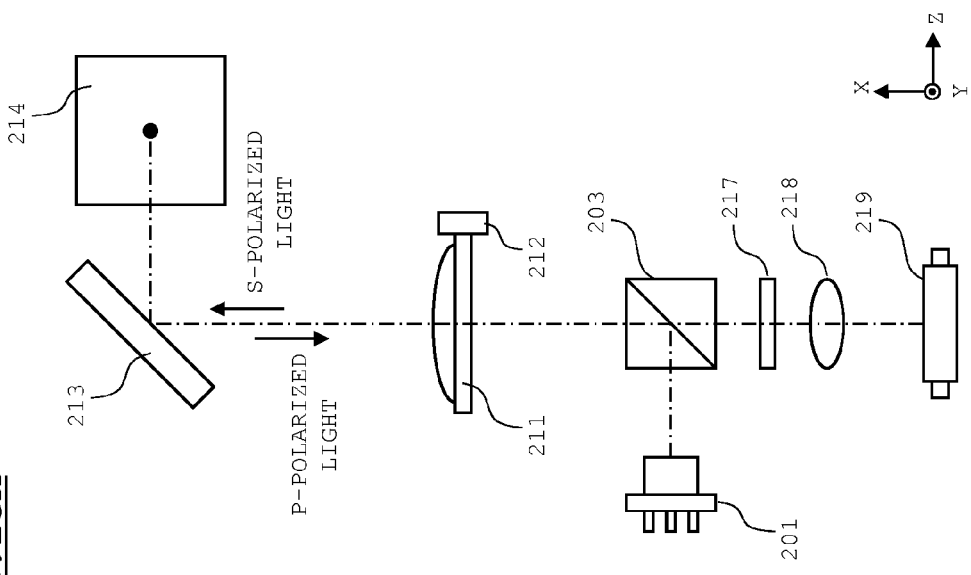
Figure 18C:
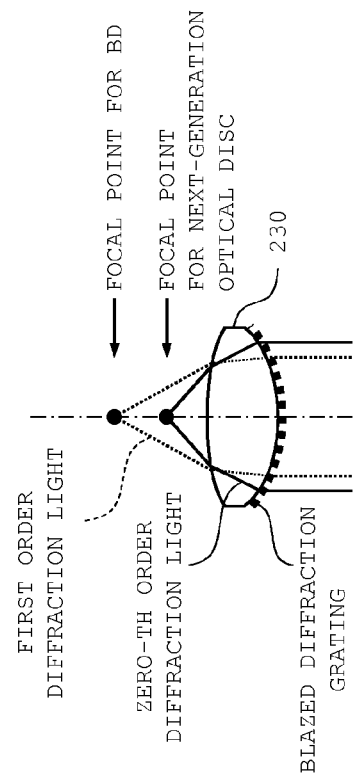

FIGS. 18A through 18C are diagram showing an optical system in the above modification. As shown in FIGS. 18A and 18B, the optical system in the modification is different from the optical system in example 2 in a point that the optical system for BD and the half wavelength plate 202 are omitted, and an objective lens 230 compatible with BD and a next-generation optical disc is mounted on an objective lens holder 221. The elements shown in FIGS. 18A and 18B have substantially the same functions as the elements indicated by the same reference numerals in FIGS. 16A and 16B. Further, a blazed diffraction grating is formed on an incident surface of the objective lens 230. A semiconductor laser 201 is disposed at such a position that laser light emitted from the semiconductor laser 201 becomes S-polarized light with respect to a polarized beam splitter 203.

In the above arrangement, as shown in FIG. 18C, zero-th order diffraction light and first order diffraction light are generated by the diffraction grating formed on the incident surface of the objective lens 230. As a result of the above operation, a focal point of first order diffraction light, and a focal point of zero-th order diffraction light are generated. In performing the above operation, the focal point of first order diffraction light is used as a focal point for BD, and the focal point of zero-th order diffraction light is used as a focal point for a next-generation optical disc having an NA larger than the NA of BD.

In the above arrangement, similarly to example 2, in performing a recording/reproducing operation for BD and a next-generation optical disc, laser light to be entered from the side of the polarized beam splitter 203 into an angle adjuster 217 includes stray light 1 or stray light 2, in addition to signal light. However, similarly to example 2, the optical pickup device having the above arrangement enables to suppress deterioration of a detection signal resulting from stray light. In addition, even in the case where a recording/reproducing operation is performed for BD or a next-generation optical disc having two or more layers, it is possible to suppress deterioration of a detection signal resulting from stray light, as described above.

The embodiment of the invention may be changed or modified in various ways as necessary, as far as such changes and modifications do not depart from the scope of the claims of the invention hereinafter defined.

What is claimed is:

1. An optical pickup device comprising:
   a laser light source which emits laser light of a predetermined wavelength;
   an objective lens portion which converges the laser light at a first focal point and a second focal point;
   an actuator which positions the first focal point or the second focal point on a recording layer in a disc;
   an astigmatism element which imparts astigmatism to the laser light reflected on the disc to set a first focal line position to be defined by convergence of the laser light in a first direction, and a second focal line position to be defined by convergence of the laser light in a second direction perpendicular to the first direction away from each other in a propagating direction of the laser light;
   a spectral element which makes propagating directions of four light fluxes obtained by dividing a light flux of the laser light reflected on the disc in four by a first straight line and a second straight line respectively in parallel to the first direction and the second direction different from each other to disperse the four light fluxes from each other; and
   a photodetector having a sensor group which receives the four light fluxes dispersed by the spectral element.

2. The optical pickup device according to claim 1, wherein the objective lens portion includes an objective lens which converges the laser light entered into the objective lens portion at the first focal point and the second focal point by diffraction.

3. The optical pickup device according to claim 2, further comprising:
   another laser light source which emits laser light of a wavelength different from the predetermined wavelength; and
   an optical system which allows incidence of the laser light emitted from the another laser light source into the objective lens, wherein the objective lens converges the laser light emitted from the another laser light source at a third focal point different from the first focal point and the second focal point by diffraction.

4. The optical pickup device according to claim 1, wherein the objective lens portion includes a first objective lens and a second objective lens, and the optical pickup device further comprises an optical system which guides the laser light emitted from the laser light source to the first objective lens and the second objective lens, and which guides the laser light reflected on the disc and transmitted through the first objective lens and the second objective lens to the photodetector.

5. The optical pickup device according to claim 1, wherein the spectral element is constituted of a prism having four tilted surfaces corresponding to the four light fluxes.

6. The optical pickup device according to claim 1, wherein the spectral element is constituted of a diffraction grating having four diffraction areas corresponding to the four light fluxes.

* * * * *